US011018552B2

(12) United States Patent
Severson et al.

(10) Patent No.: US 11,018,552 B2
(45) Date of Patent: May 25, 2021

(54) HIGH-FORCE DENSITY THREE POLE MAGNETIC BEARING

(71) Applicant: Wisconsin Alumni Research Foundation, Madison, WI (US)

(72) Inventors: Eric Loren Severson, Middleton, WI (US); Nicholas Robert Hemenway, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 56 days.

(21) Appl. No.: 16/387,959

(22) Filed: Apr. 18, 2019

(65) Prior Publication Data
US 2020/0336041 A1   Oct. 22, 2020

(51) Int. Cl.
*H02K 7/09* (2006.01)
*F16C 32/04* (2006.01)

(52) U.S. Cl.
CPC ............. *H02K 7/09* (2013.01); *F16C 32/048* (2013.01); *F16C 32/0442* (2013.01); *F16C 32/0451* (2013.01)

(58) Field of Classification Search
CPC ............ H02K 5/173; H02K 7/08; H02K 7/09; H02K 7/081–7/088; H02K 2205/03; F16C 32/048; F16C 32/0451; F16C 32/0442
See application file for complete search history.

(56) References Cited

U.S. PATENT DOCUMENTS

| 5,373,223 | A  |   | 12/1994 | Akagi et al. |
|-----------|----|---|---------|--------------|
| 6,130,494 | A  | * | 10/2000 | Schob ................ F16C 32/0463 310/90.5 |
| 6,304,015 | B1 |   | 10/2001 | Filatov et al. |
| 6,359,356 | B1 | * | 3/2002  | Hayashi ............. F16C 32/0457 310/90.5 |
| 6,365,996 | B2 | * | 4/2002  | Schob ................ F16C 32/0463 310/90.5 |
| 6,727,617 | B2 |   | 4/2004  | McMullen et al. |
| 7,557,480 | B2 |   | 7/2009  | Filatov |

(Continued)

OTHER PUBLICATIONS

Oishi et al., "A Novel Parallel Motor Winding Structure for Bearingless Motors," IEEE Transactions on Magnetics, vol. 49, No. 5, May 2013, pp. 2287-2290.

(Continued)

*Primary Examiner* — Bickey Dhakal
(74) *Attorney, Agent, or Firm* — Bell & Manning, LLC

(57) ABSTRACT

A first radial force value and a second radial force value is received by a radial magnetic bearing controller. Coefficients are computed for a first equation using the first and second radial force values. The first equation is solved to define first solution values. A second solution value paired with each first solution value is computed using the first radial force value and a respective first solution value to define second solution values. Control current sets are computed for each unique paired solution of the second solution values and the first solution values. Each control current set includes a control current value for each of three control currents. A control current value for each of the three control currents is selected from the control current sets. The control current value for each of the three control currents is output to a respective radial winding of a three-pole radial magnetic bearing.

20 Claims, 28 Drawing Sheets

(56) References Cited

U.S. PATENT DOCUMENTS

| | | | |
|---|---|---|---|
| 8,102,088 B2 | 1/2012 | Filatov | |
| 8,169,118 B2 | 5/2012 | Filatov | |
| 8,378,543 B2 | 2/2013 | Filatov | |
| 8,482,174 B2 | 7/2013 | Filatov | |
| 8,564,281 B2 | 10/2013 | Filatov | |
| 8,796,894 B2 | 8/2014 | Filatov | |
| 8,847,451 B2 | 9/2014 | Filatov et al. | |
| 9,024,494 B2 | 5/2015 | Hawkins et al. | |
| 9,531,236 B2 | 12/2016 | Filatov | |
| 9,559,565 B2 | 1/2017 | Filatov et al. | |
| 9,683,601 B2 | 6/2017 | Filatov | |
| 2001/0033115 A1* | 10/2001 | Heine | F16C 32/0493 310/90.5 |
| 2003/0085627 A1 | 5/2003 | Lipo et al. | |
| 2004/0222754 A1 | 11/2004 | Ochiai et al. | |
| 2009/0001917 A1* | 1/2009 | Hosek | F16C 32/0493 318/491 |
| 2012/0319542 A1 | 12/2012 | Hazeyama et al. | |
| 2018/0180095 A1* | 6/2018 | Jastrzebski | H02K 11/21 |
| 2018/0291957 A1* | 10/2018 | Sakawaki | F16C 32/0448 |

OTHER PUBLICATIONS

Severson et al., "Practical Implementation of Dual Purpose No Voltage Drives for Bearingless Motors," IEEE 2015, pp. 819-826.
Irving, Ron. Beyond the Quadratic Formula, American Mathematical Society, 2010. ProQuest Ebook Central, https://ebookcentral.proquest.com/lib/wisc/detail.action?docID=3330361 (cover, preface and table of contents only).

* cited by examiner

HIGH-FORCE DENSITY THREE POLE MAGNETIC BEARING

BACKGROUND

Mechanical bearings used to support the shaft of high speed motor systems severely limit the system lifetime, can be a source of significant losses, and require lubricants that can interfere with the broader system. Active magnetic bearings (AMBs) offer a contact-free solution to overcome these issues. This technology has seen commercial deployment in certain compressor applications, such as HVAC chillers, wastewater aeration, and natural gas transportation. Recently, bearingless motors have been developed that combine the electric motor and the AMB into a single machine where the same iron and copper are used for creating torque and suspension forces resulting in a highly integrated, compact, and low cost design with the potential to overcome the shortcomings of AMB-based motor systems.

A traditional bearingless motor produces radial suspension forces within the motor's air gap. This means that it is capable of stabilizing two radial degrees of freedom (DOF), but relies on external support for the remaining three DOF (axial and tilting directions). This can be provided by using standard radial AMBs and axial AMBs, but the bulky nature of these devices limit the shaft length available to the motor because portions of the shaft length are occupied by the motor bearings and are therefore unavailable to be used for creating torque.

SUMMARY

In an example embodiment, a non-transitory computer-readable medium is provided having stored thereon computer-readable instructions that, when executed by a processor, cause a controller to compute a current for each radial coil of a radial magnetic bearing. An indicator of a first radial force value in a first radial force direction and a second radial force value in a second radial force direction is received. The first radial force direction is perpendicular to the second radial force direction. Coefficients are computed for a first equation using the first radial force value and the second radial force value. The first equation is a non-linear equation. The first equation is solved to define a plurality of first solution values. A second solution value paired with each first solution value of the plurality of first solution values is computed using the first radial force value and a respective first solution value to define a plurality of second solution values. A plurality of control current sets is computed. Each control current set of the plurality of control current sets includes a control current value for each of three control currents. The plurality of control current sets includes a control current set computed for each unique paired solution of the plurality of second solution values and the plurality of first solution values. A control current value for each of the three control currents is selected from a control current set of the computed plurality of control current sets. The selected control current value for each of the three control currents is output to a respective radial winding of a three-pole radial magnetic bearing.

Other principal features of the disclosed subject matter will become apparent to those skilled in the art upon review of the drawings described below, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
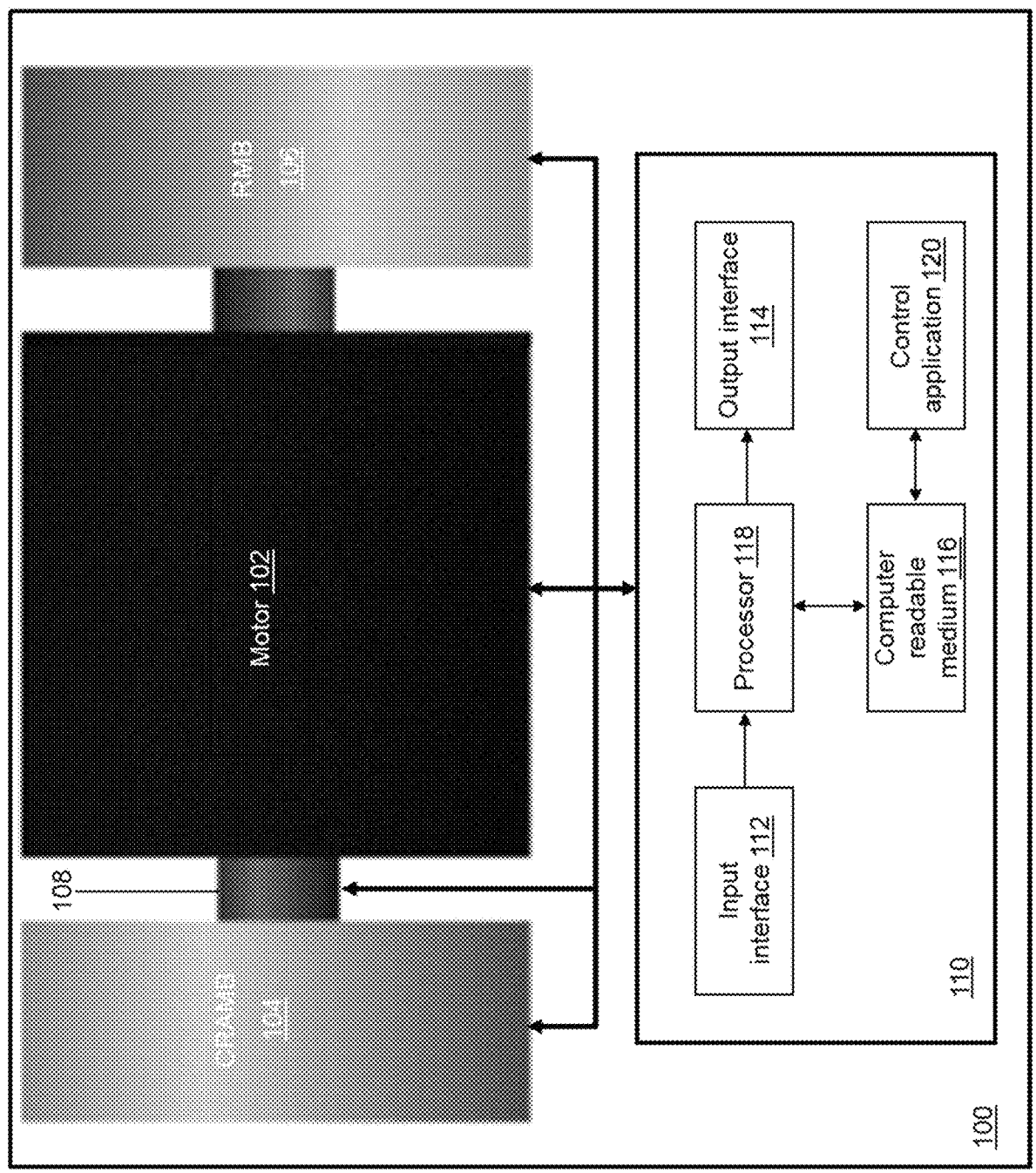
FIG. 1 depicts a motor system in accordance with an illustrative embodiment.

Referring to FIG. 1, a block diagram of an electrical machine system 100 is shown in accordance with an illustrative embodiment. Electrical machine system 100 may include a motor 102, a combined radial and axial magnetic bearing (CRAMB) 104, a radial magnetic bearing (RMB) 106, a rotor 108, and an electrical machine controller 110. Rotor 108 is common to motor 102, CRAMB 104, and RMB 106.

Motor 102 can be implemented as any type of radial flux machine such as a permanent magnet (PM) machine, a synchronous reluctance machine, an induction machine, a consequent-pole machine, an alternating current (AC) homopolar machine, etc. Motor 102 further may be bearingless motor eliminating a need for RMB 106. A bearingless motor provides a functionality of a magnetic bearing and a motor in a single electric machine. Compared to systems that utilize a motor with separate magnetic bearings, bearingless technology results in a more integrated system that requires less raw material and can be designed for higher speeds due to shorter shaft lengths. Applications for a bearingless motor range from low speed, hygienic mixing devices, pumps, and artificial hearts to high and ultra-high speed machines for flywheels, spindle tools, and turbomachinery, etc.

Electrical machine controller 110 may include an input interface 112, an output interface 114, a non-transitory computer-readable medium 116, a processor 118, and a control application 120. Fewer, different, and/or additional components may be incorporated into electrical machine controller 110.

Input interface 112 provides an interface for receiving information from the user or another device for entry into electrical machine controller 110 as understood by those skilled in the art. Input interface 112 may interface with various input technologies including, but not limited to, a keyboard, a microphone, a mouse, a display, a track ball, a keypad, one or more buttons, etc. to allow the user to enter information into electrical machine controller 110 or to make selections presented in a user interface displayed on the display. Input interface 112 may further receive signals such as sensor signals from any of motor 102, CRAMB 104, and RMB 106.

The same interface may support both input interface 112 and output interface 114. For example, a touch screen provides a mechanism for user input and for presentation of output to the user. Electrical machine controller 110 may have one or more input interfaces that use the same or a different input interface technology. The input interface technology further may be accessible by electrical machine controller 110 through a communication interface (not shown).

Output interface 114 provides an interface for outputting information for review by a user of electrical machine controller 110 and/or for use by another application or device. For example, output interface 114 may interface with various output technologies including, but not limited to, the display, a speaker, a printer, etc. Electrical machine controller 110 may have one or more output interfaces that use the same or a different output interface technology. Output interface 114 may further output control signals in the form of currents or voltages to any of motor 102, CRAMB 104, and RMB 106. Output interface 114 further may be accessible by electrical machine controller 110 through the communication interface.

Computer-readable medium 116 is an electronic holding place or storage for information so the information can be accessed by processor 118 as understood by those skilled in the art. Computer-readable medium 116 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Electrical machine controller 110 may have one or more computer-readable media that use the same or a different memory media technology. For example, computer-readable medium 116 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Electrical machine controller 110 also may have one or more drives that support the loading of a memory media such as a CD, DVD, an external hard drive, etc. One or more computer-readable media may be connected to electrical machine controller 110 using the communication interface.

Processor 118 executes instructions as understood by those skilled in the art. The instructions may be carried out by a special purpose computer, logic circuits, or hardware circuits. Processor 118 may be implemented in hardware and/or firmware. Processor 118 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 118 operably couples with input interface 112, with output interface 114, and with computer-readable medium 116 to receive, to send, and to process information. Processor 118 may retrieve a set of instructions from a permanent memory device and copy the instructions in an executable form to a temporary memory device that is generally some form of RAM. Electrical machine controller 110 may include a plurality of processors that use the same or a different processing technology.

Some processors may be central processing units (CPUs). Some processes may be more efficiently and speedily executed and processed with machine specific processors. For example, some of these processors can include an application-specific integrated circuit, a field-programmable gate array, a purpose-built chip architecture, etc. using semiconductor devices.

Control application 120 performs operations associated with controlling operation of motor 102, CRAMB 104, and/or RMB 106. Some or all of the operations described herein may be embodied in control application 120. The operations may be implemented using hardware, firmware, software, or any combination of these methods. Referring to the example embodiment of FIG. 1, control application 120 is implemented in software (comprised of computer-readable and/or computer-executable instructions) stored in computer-readable medium 116 and accessible by processor 118 for execution of the instructions that embody the operations of control application 120. Control application 120 may be written using one or more programming languages, assembly languages, scripting languages, etc.

Figure 2:
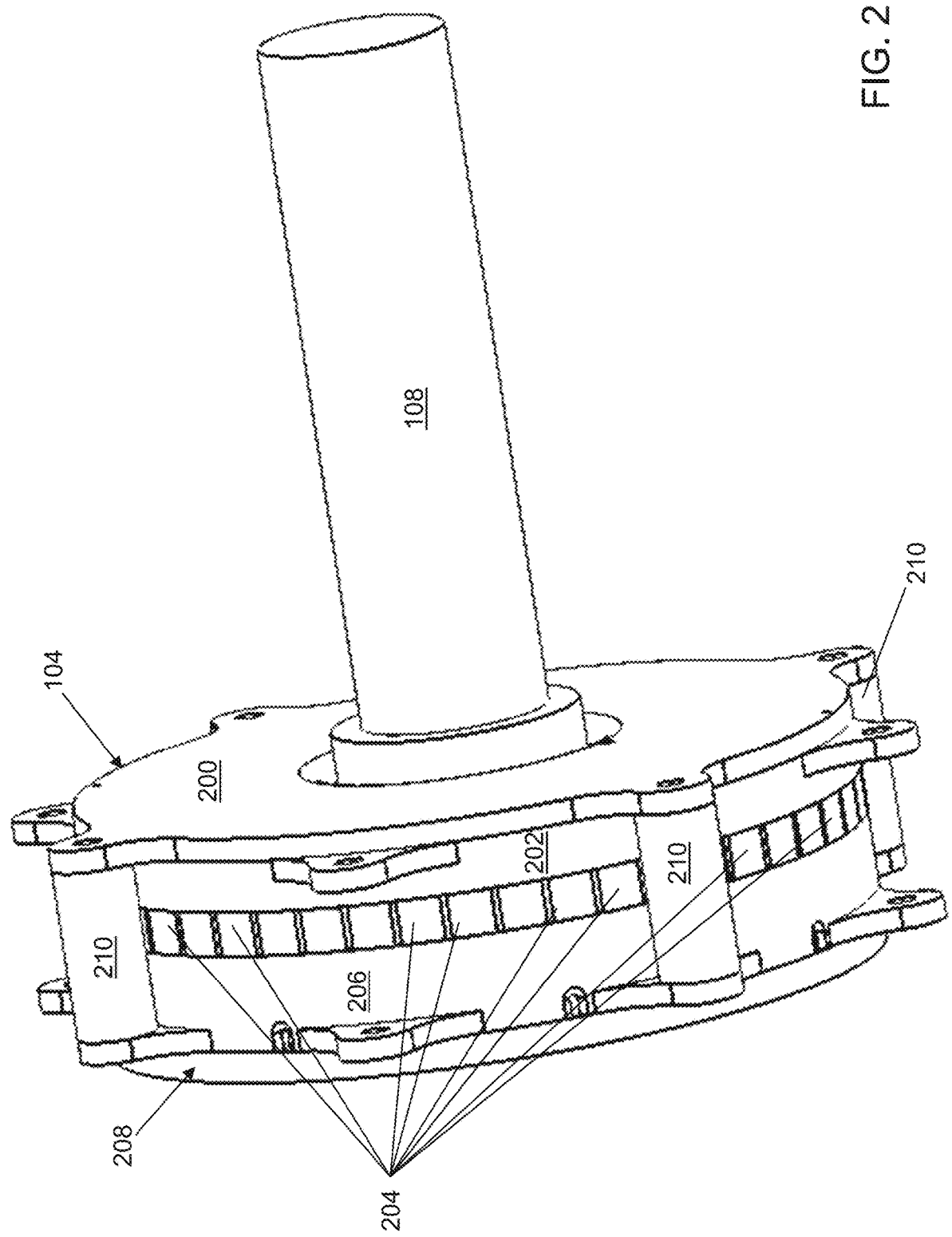
FIG. 2 depicts a perspective view of a combined radial-axial magnetic bearing (CRAMB) of the motor system of FIG. 1 in accordance with an illustrative embodiment.
Figure 3:
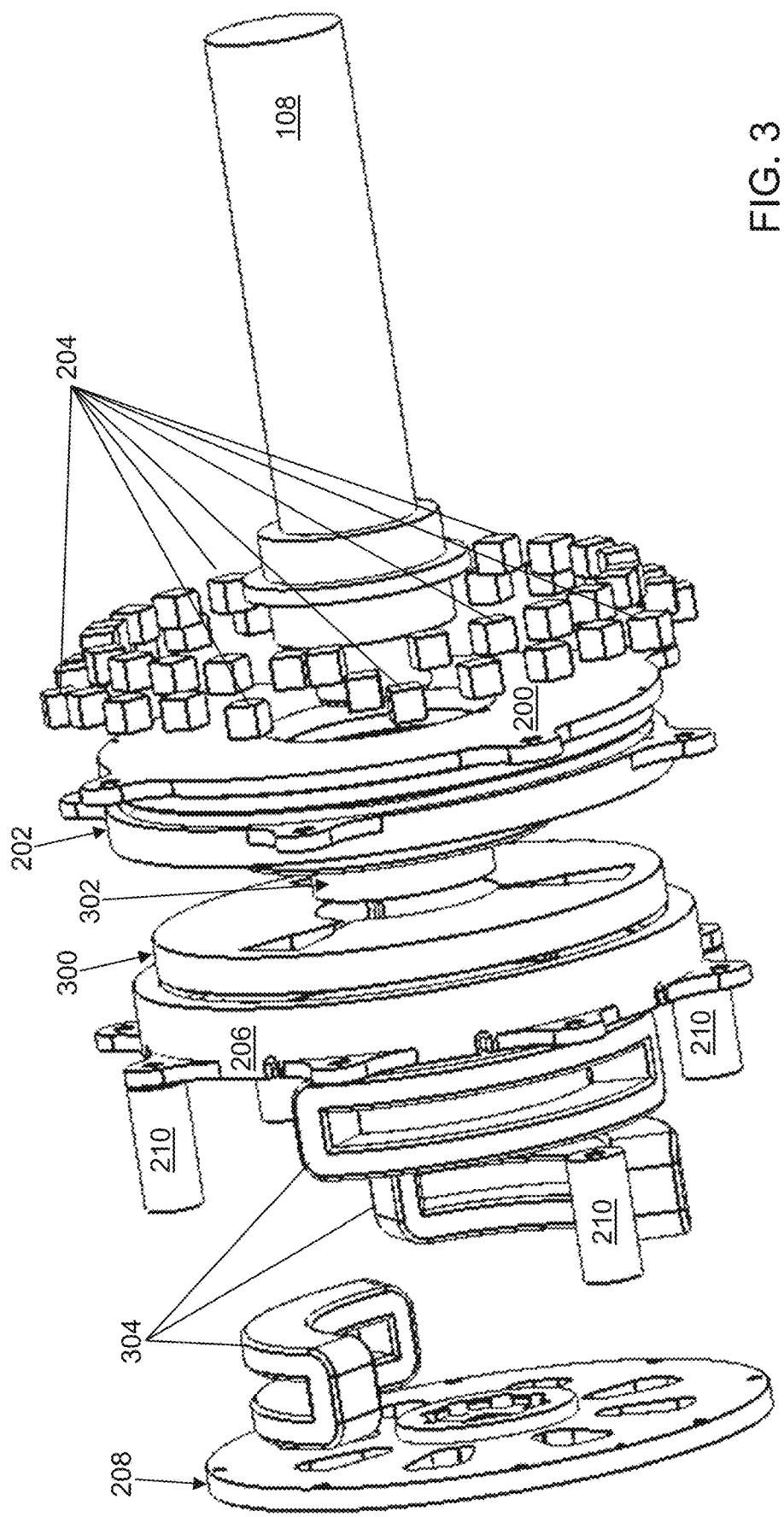
FIG. 3 depicts an exploded, perspective view of the CRAMB of FIG. 2 in accordance with an illustrative embodiment.

Referring to FIG. 2, a perspective view of CRAMB 104 is shown in accordance with an illustrative embodiment. Referring to FIG. 3, an exploded, perspective view of CRAMB 104 is shown in accordance with an illustrative embodiment. CRAMB 104 may include an axial stator cap 200, an axial stator 202, a plurality of permanent magnets 204, a ring stator 206, a baseplate 208, a plurality of standoffs 210, a radial stator lamination stack 300, a compensation coil 302, three radial coils 304, an axial coil 400 (shown referring to FIG. 4), and a radial rotor lamination stack 700 (shown referring to FIG. 7).

In the illustrative embodiment, CRAMB 104 has a side-by-side topology that includes a three pole RMB portion (stage) that is separated from an axial magnetic bearing (AMB) portion (stage) by the plurality of permanent magnets 204. The plurality of permanent magnets 204 provide a bias flux that magnetizes CRAMB 104, while the RMB portion and the AMB portion each contain the three radial coils 304 and axial coil 400, respectively, to create controllable radial and axial forces on rotor 108, respectively. Though not shown, RMB 106 can be configured similar to the three pole RMB portion of CRAMB 104 to exert radial forces on an opposite end of rotor 108. The side-by-side topology of CRAMB 104 reduces a required shaft length of rotor 108 by increasing both a radial linear force density and an axial linear force density.

CRAMB 104 includes compensation coil 302 housed in the RMB portion of CRAMB 104 to decouple the axial and radial operation. Compensation coil 302 is connected in series with axial coil 400 to compensate a parasitic flux produced by axial coil 400.

The components of CRAMB 104 and RMB 106 may be formed of one or more materials, such as a metal, a magnetic material, and/or a plastic having a sufficient strength and rigidity and conductivity to provide the described function.

In an illustrative embodiment, components of CRAMB 104 and RMB 106 are formed of a metal material such as steel.

Figure 4:
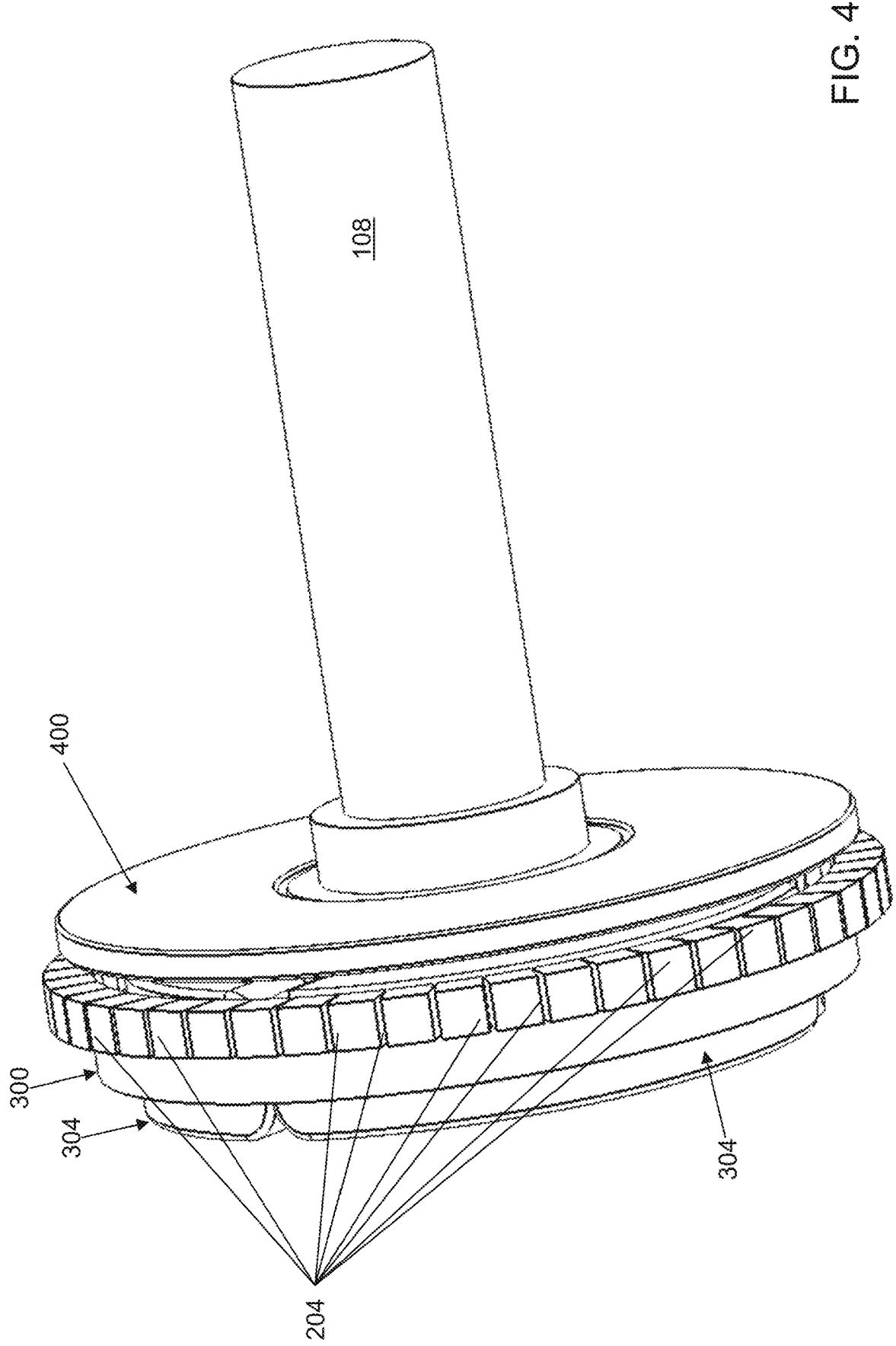
FIG. 4 depicts a perspective view of the CRAMB of FIG. 2 without external components to view an interior arrangement of the CRAMB in accordance with an illustrative embodiment.
Figure 5:
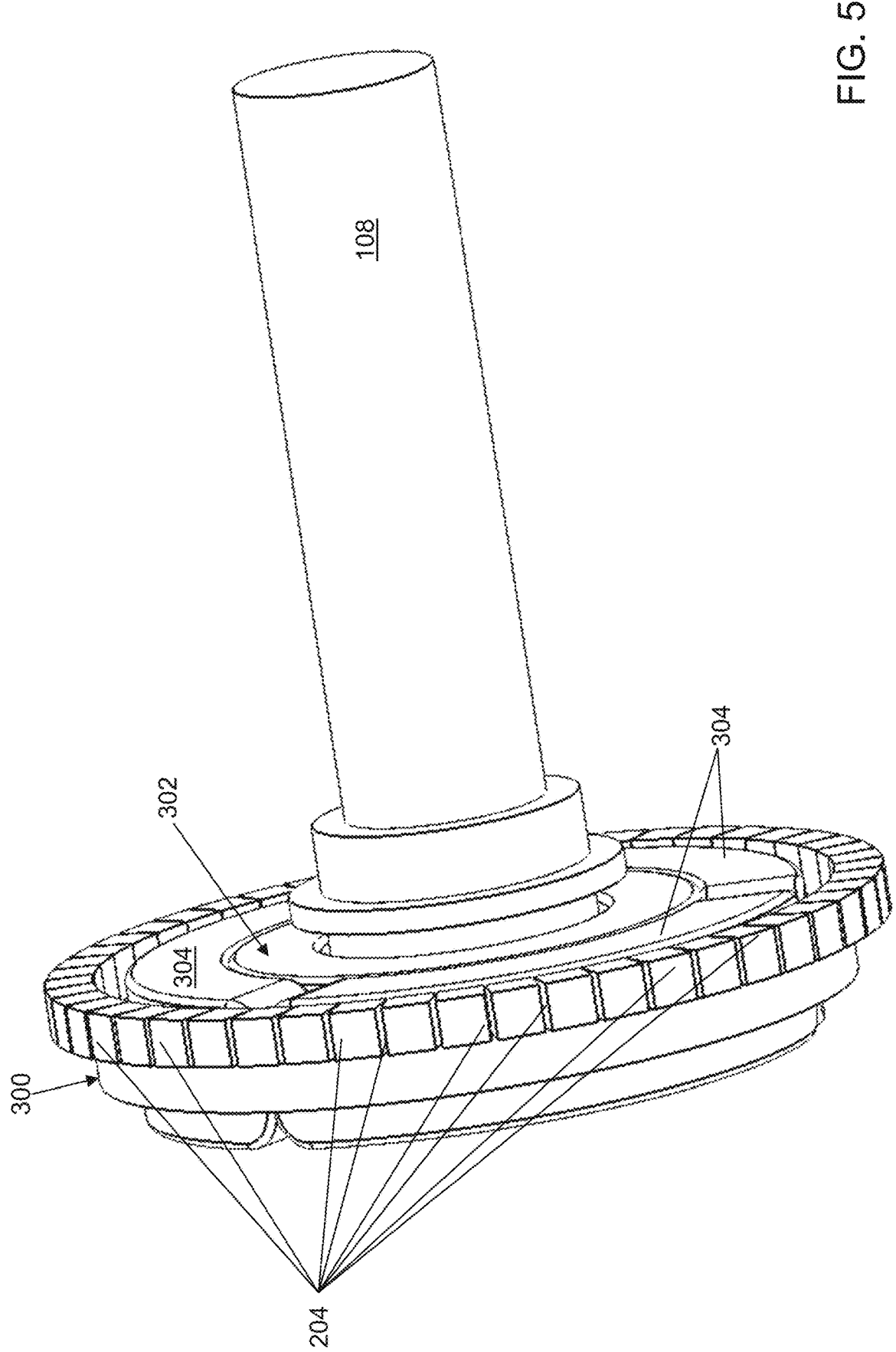
FIG. 5 depicts a perspective view of the CRAMB of FIG. 2 without additional components in accordance with an illustrative embodiment.
Figure 6:
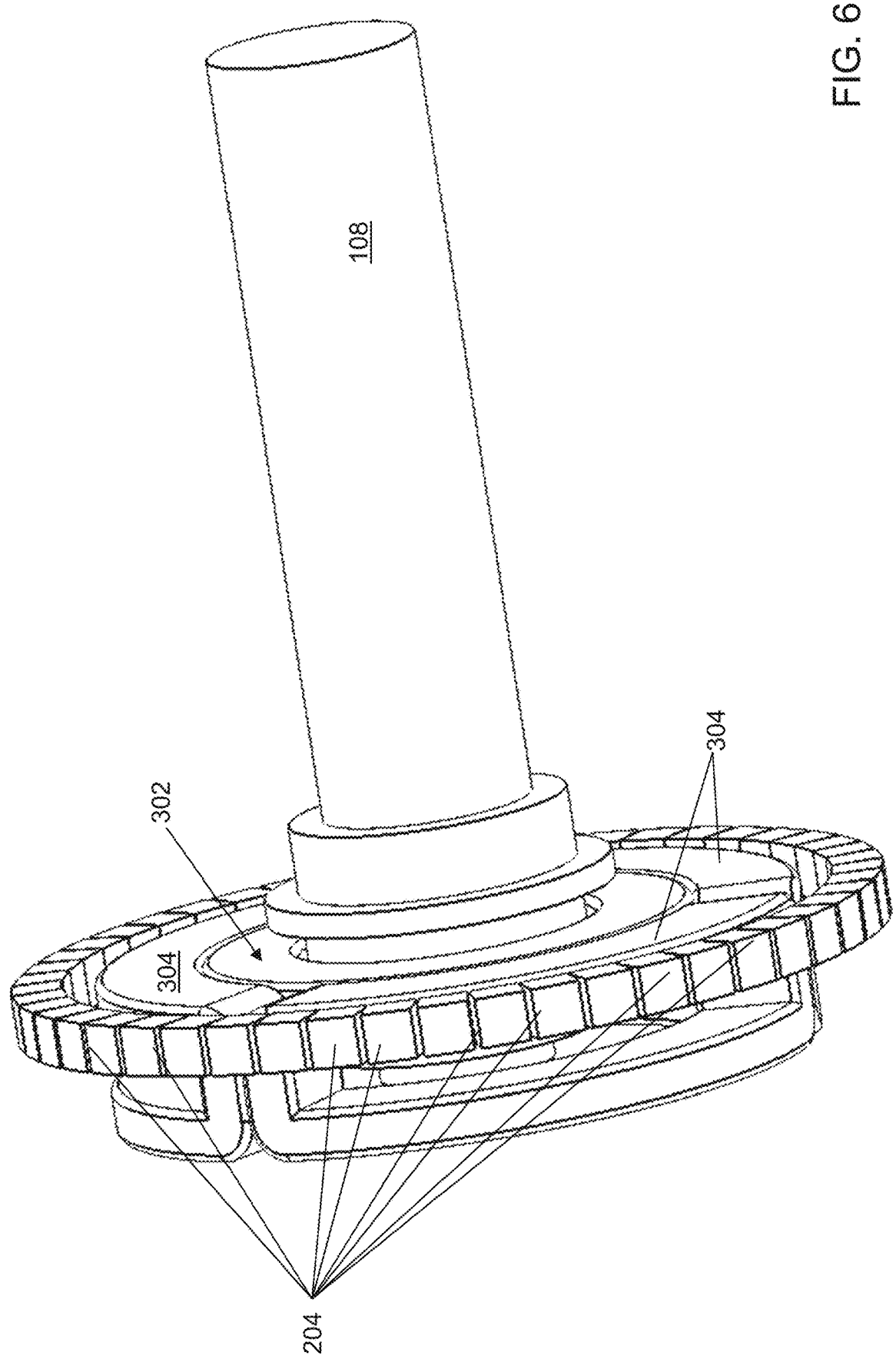
FIG. 6 depicts a perspective view of the CRAMB of FIG. 2 without still additional components in accordance with an illustrative embodiment.
Figure 7:
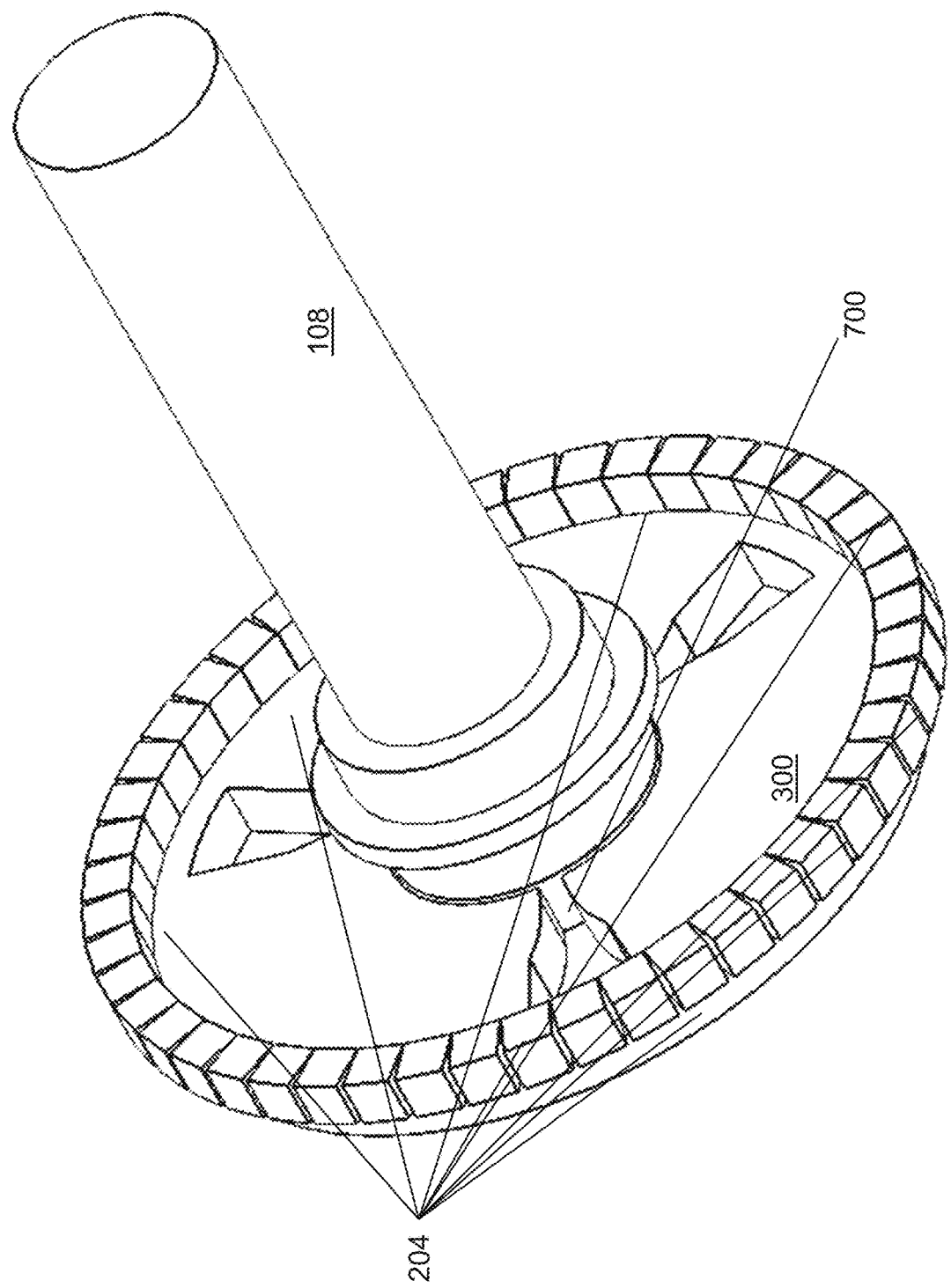
FIG. 7 depicts a perspective view of the CRAMB of FIG. 2 without yet additional components in accordance with an illustrative embodiment.

Referring to FIG. 4, a perspective view of CRAMB 104 without axial stator cap 200, axial stator 202, ring stator 206, baseplate 208, and the plurality of standoffs 210 is shown in accordance with an illustrative embodiment. Referring to FIG. 5, a perspective view of CRAMB 104 without axial stator cap 200, axial stator 202, ring stator 206, baseplate 208, the plurality of standoffs 210, and axial coil 400 is shown in accordance with an illustrative embodiment. Referring to FIG. 6, a perspective view of CRAMB 104 without axial stator cap 200, axial stator 202, ring stator 206, baseplate 208, the plurality of standoffs 210, axial coil 400, and radial stator lamination stack 300 is shown in accordance with an illustrative embodiment. Referring to FIG. 7, a perspective view of CRAMB 104 without axial stator cap 200, axial stator 202, ring stator 206, baseplate 208, the plurality of standoffs 210, axial coil 400, radial stator lamination stack 300, compensation coil 302, and the three radial coils 304 is shown in accordance with an illustrative embodiment.

Figure 8:
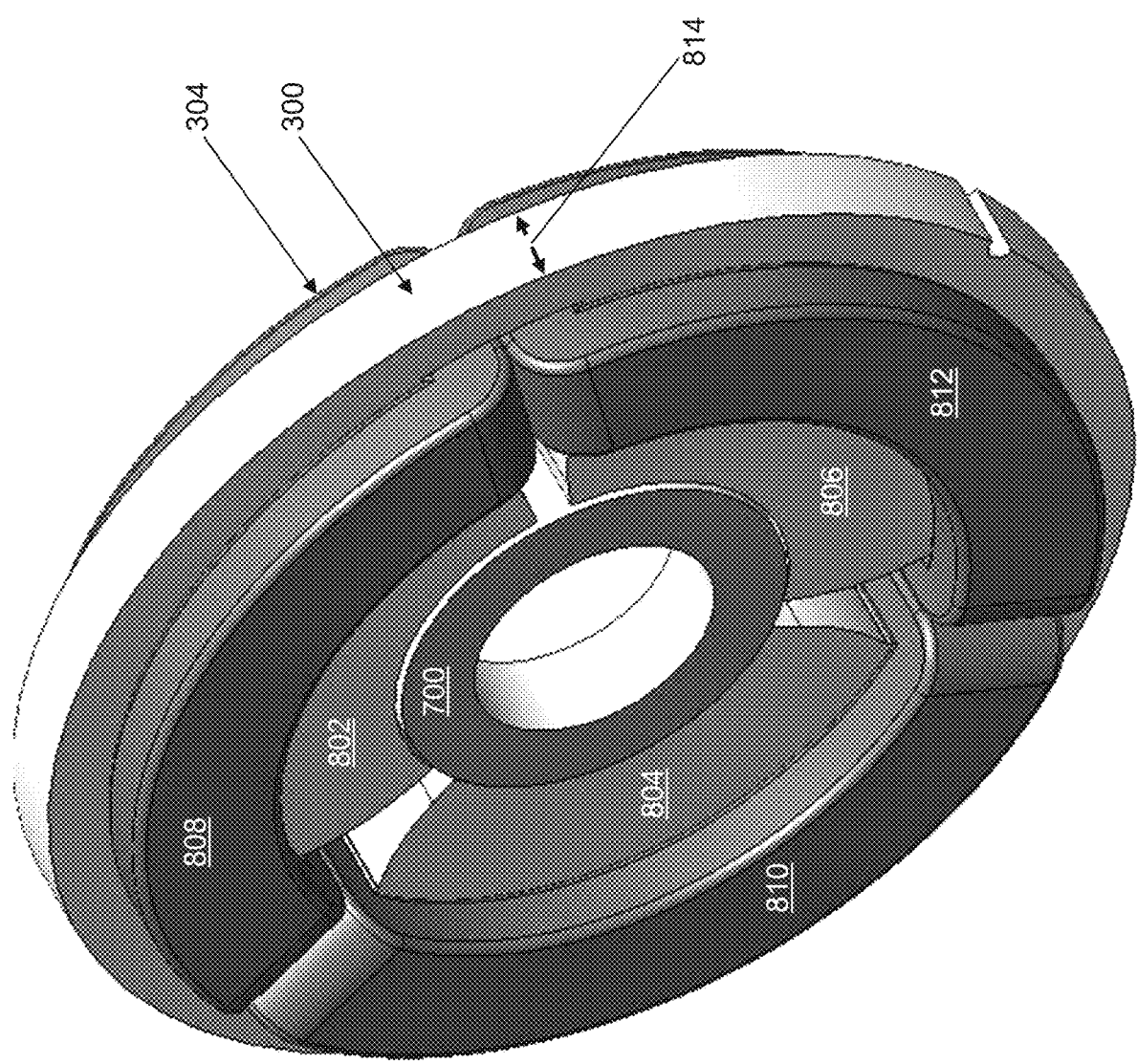
FIG. 8 depicts a perspective view of a radial rotor lamination stack, a radial stator lamination stack, and radial coils of the CRAMB of FIG. 2 in accordance with an illustrative embodiment.
Figure 9:
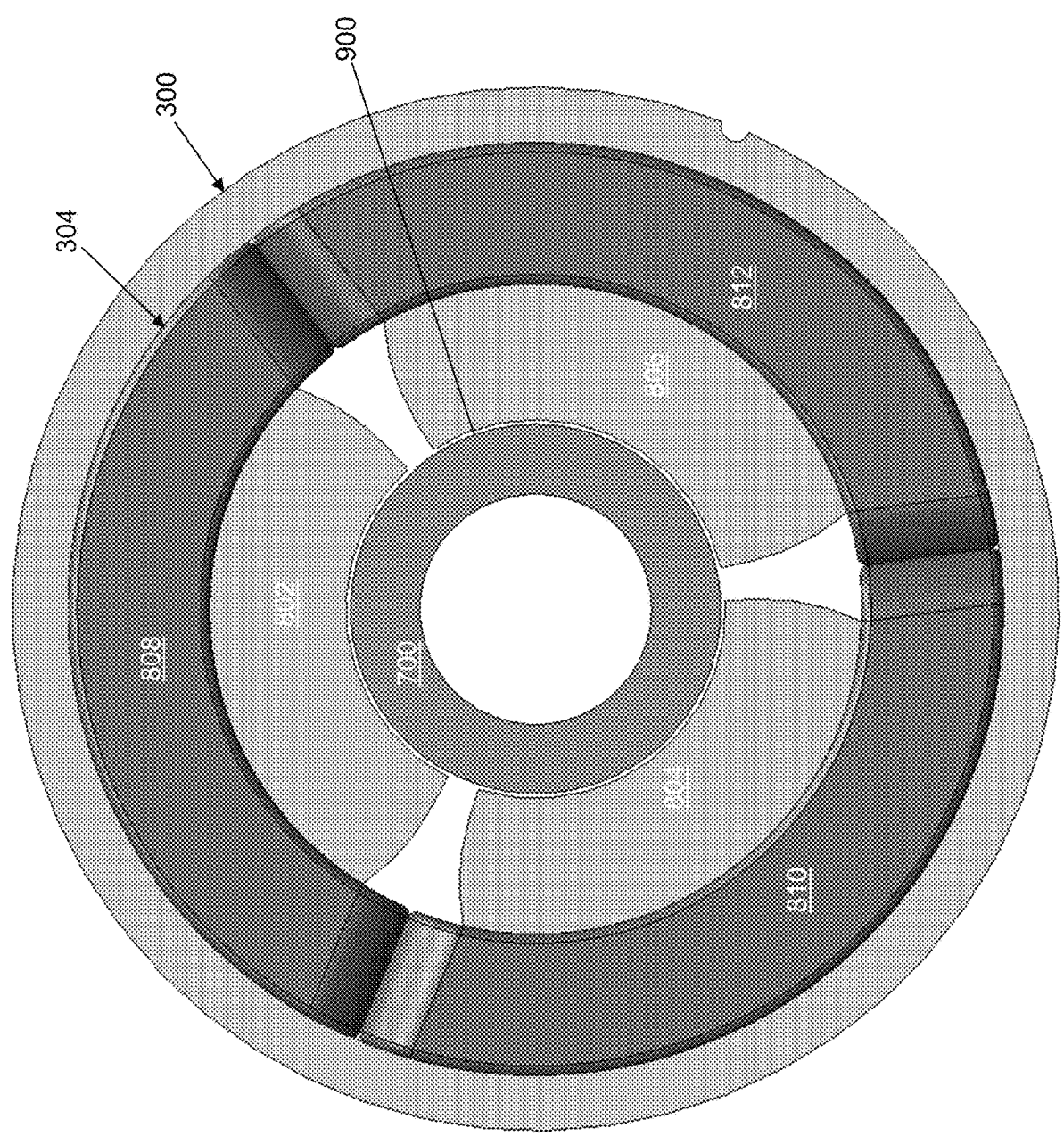
FIG. 9 depicts a top view of the radial rotor lamination stack, the radial stator lamination stack, and the radial coils of FIG. 8 in accordance with an illustrative embodiment.
Figure 10:
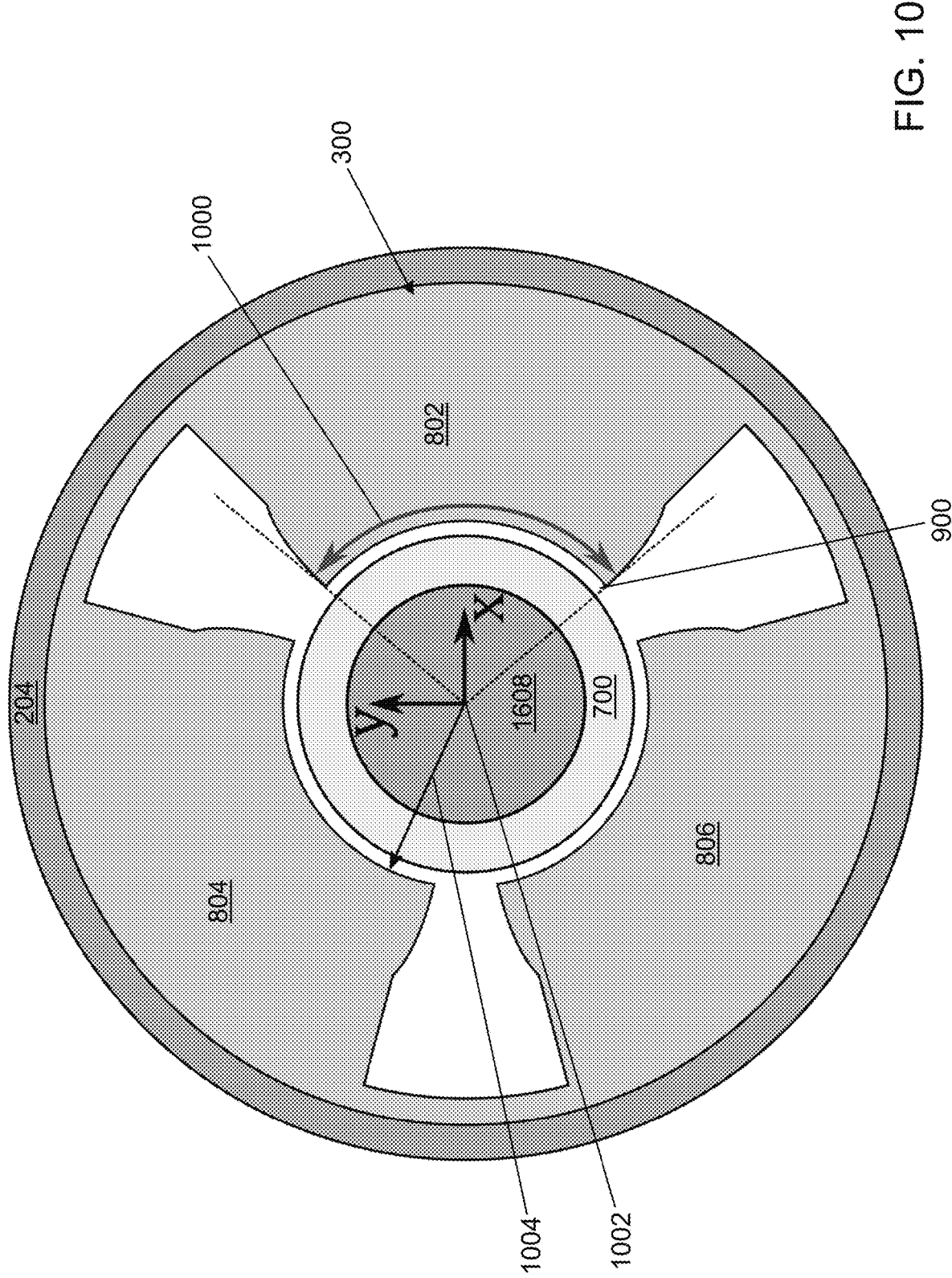
FIG. 10 depicts a simplified top view of the radial rotor lamination stack, the radial stator lamination stack, and the radial coils of FIG. 8 with an illustrative orientation and with illustrative dimensions.

Referring to FIG. 8, a perspective view of radial rotor lamination stack 700, radial stator lamination stack 300, and the three radial coils 304 are shown in accordance with an illustrative embodiment. Referring to FIG. 9, a top view of radial rotor lamination stack 700, radial stator lamination stack 300, and the three radial coils 304 are shown in accordance with an illustrative embodiment. Referring to FIG. 10, a simplified top view of radial rotor lamination stack 700, radial stator lamination stack 300, and the three radial coils 304 are shown with an illustrative orientation and with illustrative dimensions. Radial stator lamination stack 300 includes a first radial stator lamination tooth 802, a second radial stator lamination tooth 804, and a third radial stator lamination tooth 806. The three radial coils 304 include a first radial coil 808, a second radial coil 810, and a third radial coil 812. First radial coil 808, second radial coil 810, and third radial coil 812 define a shape having N turns of coil winding wound around first radial stator lamination tooth 802, second radial stator lamination tooth 804, and third radial stator lamination tooth 806, respectively. Radial stator lamination stack 300 has a stator lamination stack thickness 814 in the axial direction. Radial rotor lamination stack 700 and radial stator lamination stack 300 are radially separated by a radial air gap having a radial air gap length 900. First radial stator lamination tooth 802, second radial stator lamination tooth 804, and third radial stator lamination tooth 806 are shaped to have a radial tooth angle 1000 that defines an angle that each radial tooth spans relative to a rotor shaft center 1002. Radial stator lamination stack 300 may be shaped such that a stator lamination stack aperture wall 2600 (shown referring to FIG. 26) has a stator inner radius 1004 measured from rotor shaft center 1002. An x-axis and a y-axis define a radial plane of radial stator lamination stack 300.

Figure 11:
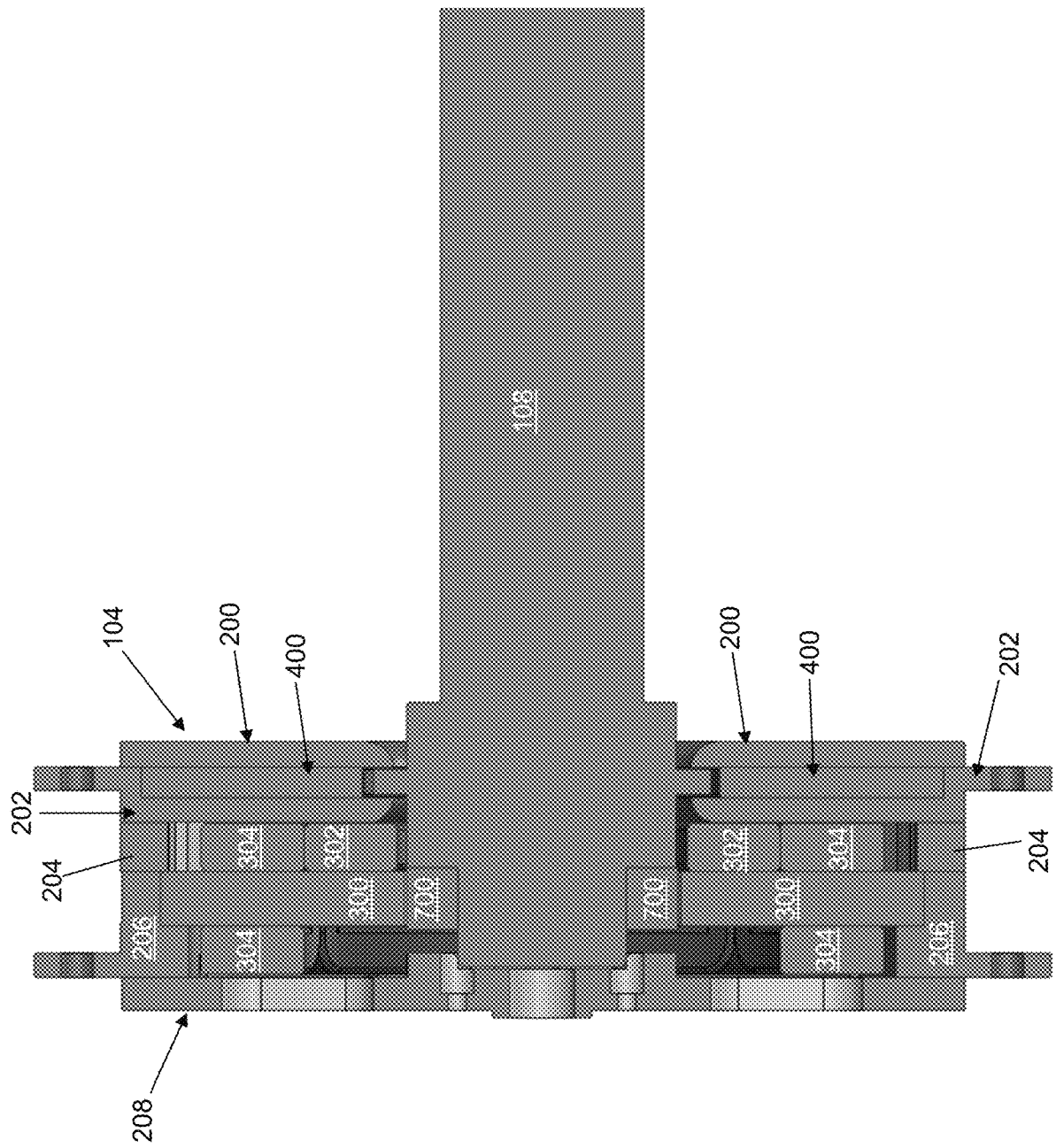
FIG. 11 depicts a center axial plane cross-sectional view of the CRAMB of FIG. 2 in accordance with an illustrative embodiment.
Figure 12:
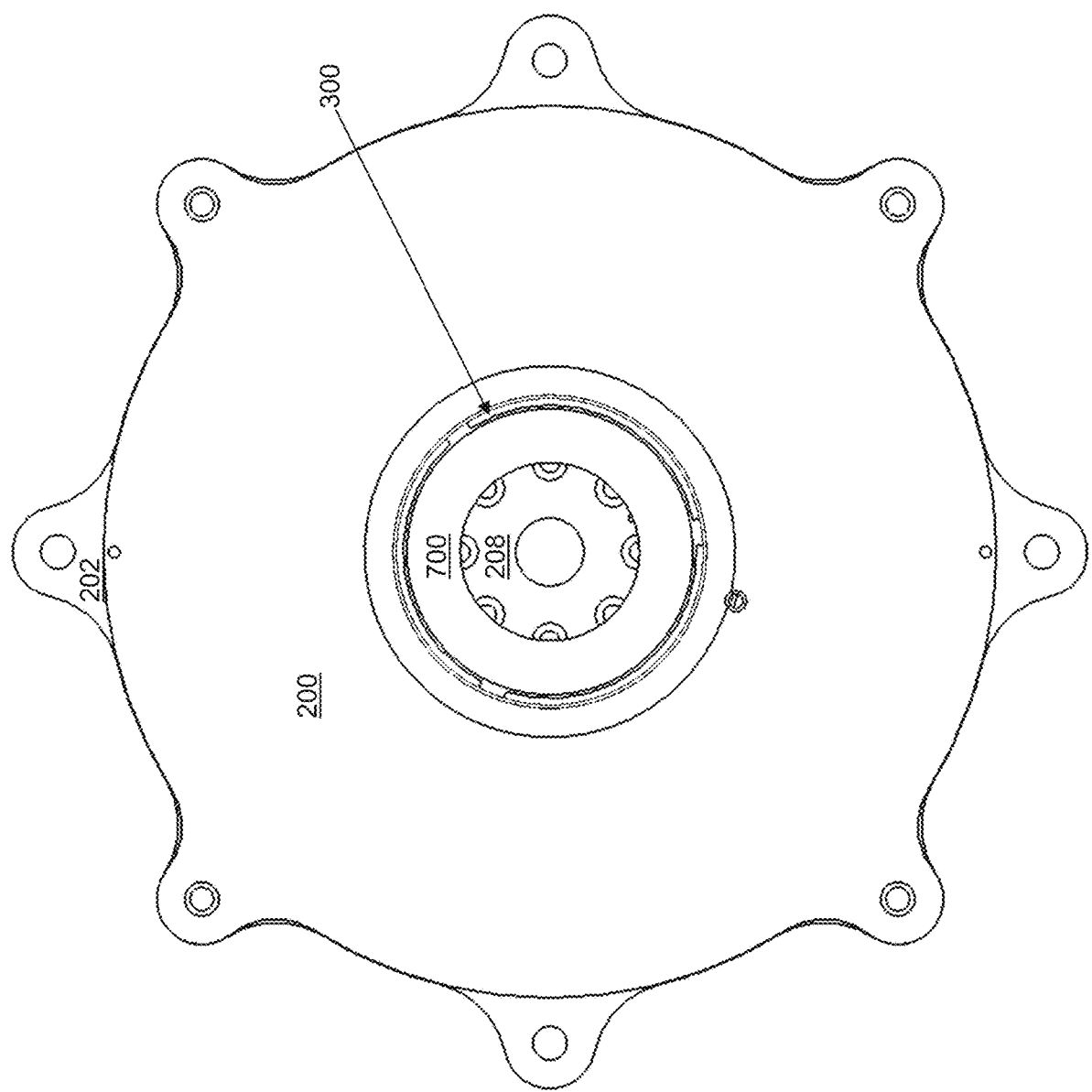
FIG. 12 depicts a top radial plane view of the CRAMB of FIG. 2 in accordance with an illustrative embodiment.
Figure 13:
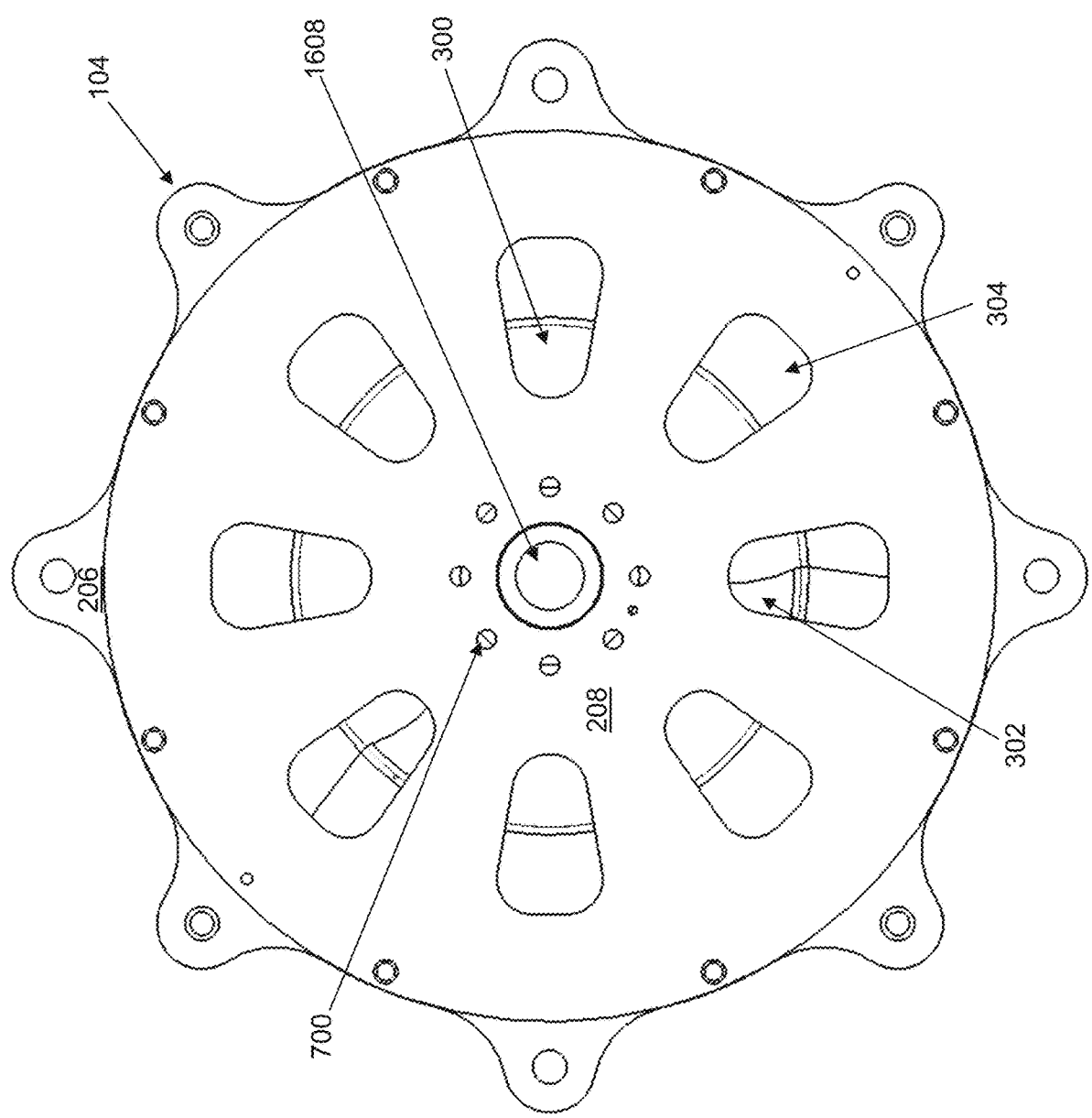
FIG. 13 depicts a bottom radial plane view of the CRAMB of FIG. 2 in accordance with an illustrative embodiment.
Figure 14:
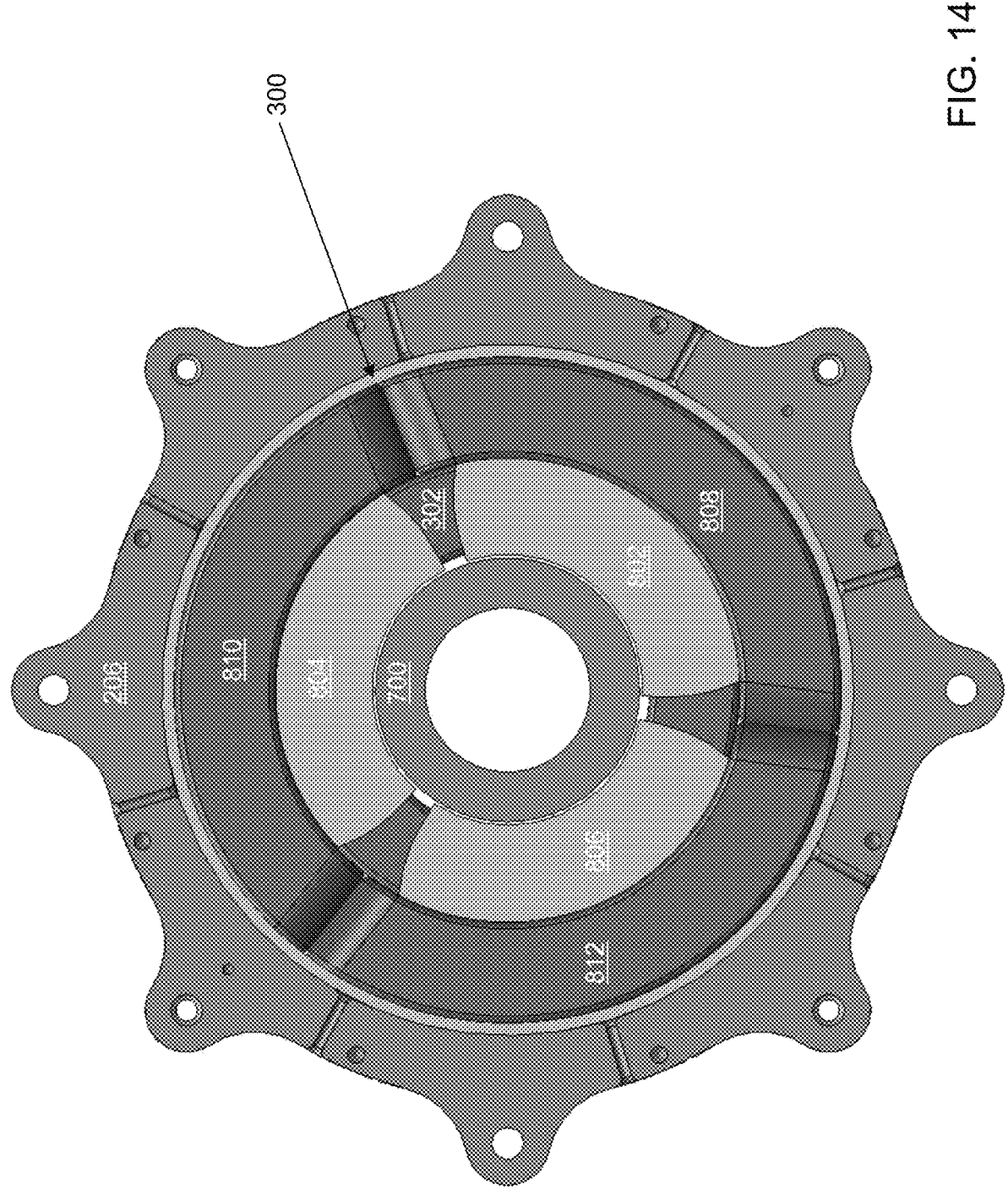
FIG. 14 depicts a bottom radial plane view of the CRAMB of FIG. 2 with a baseplate removed in accordance with an illustrative embodiment.
Figure 15:
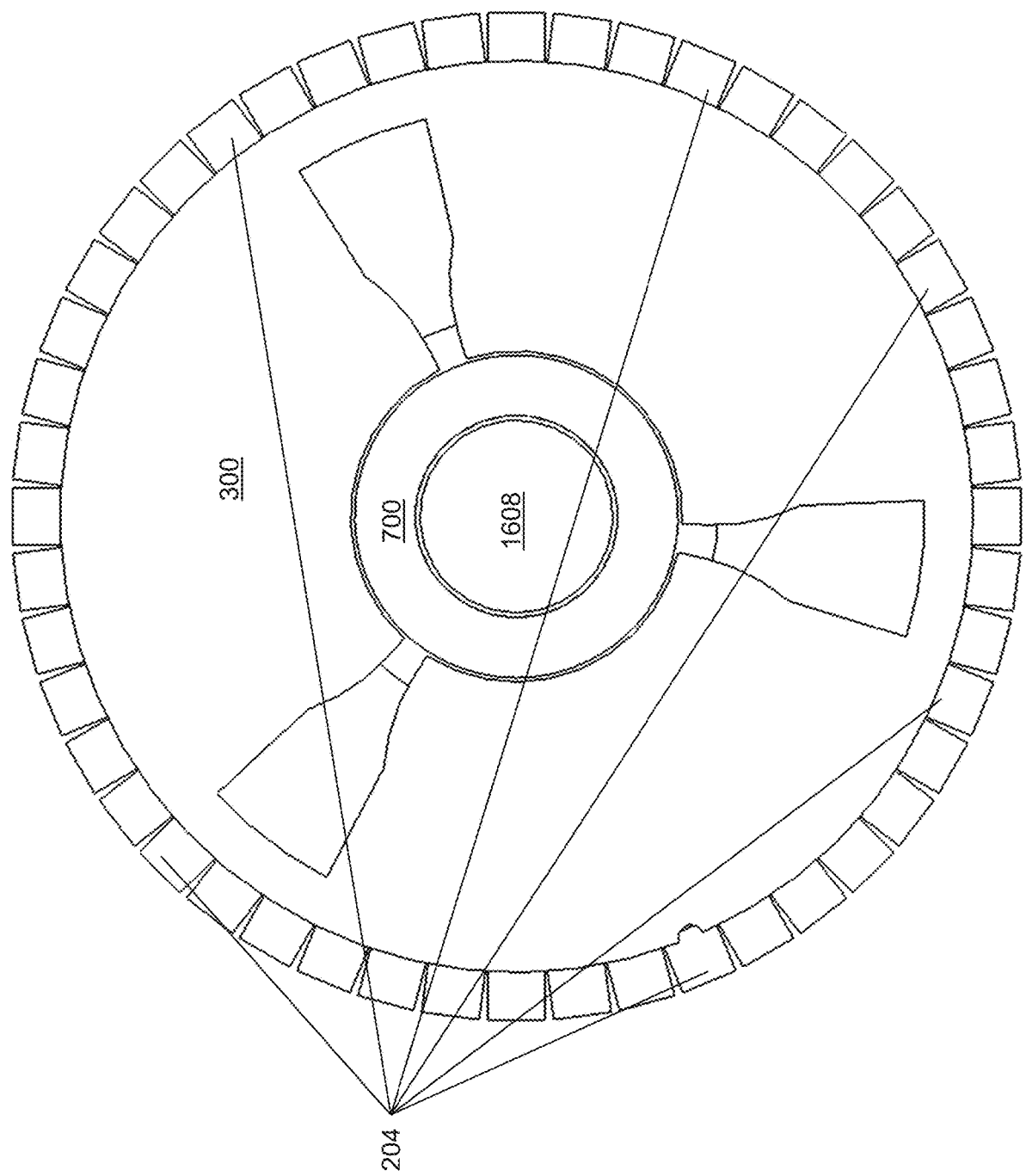
FIG. 15 depicts a bottom radial plane view of the CRAMB of FIG. 2 without the external components in accordance with an illustrative embodiment.

Referring to FIG. 11, a center axial plane cross-sectional view of CRAMB 104 is shown in accordance with an illustrative embodiment. Referring to FIG. 12, a top radial plane view of CRAMB 104 is shown in accordance with an illustrative embodiment. Referring to FIG. 13, a bottom radial plane view of CRAMB 104 is shown in accordance with an illustrative embodiment. Referring to FIG. 14, a bottom radial plane view of CRAMB 104 is shown with baseplate 108 removed in accordance with an illustrative embodiment. Referring to FIG. 15, a bottom radial plane view of CRAMB 104 is shown without the external components in accordance with an illustrative embodiment.

Figure 16:
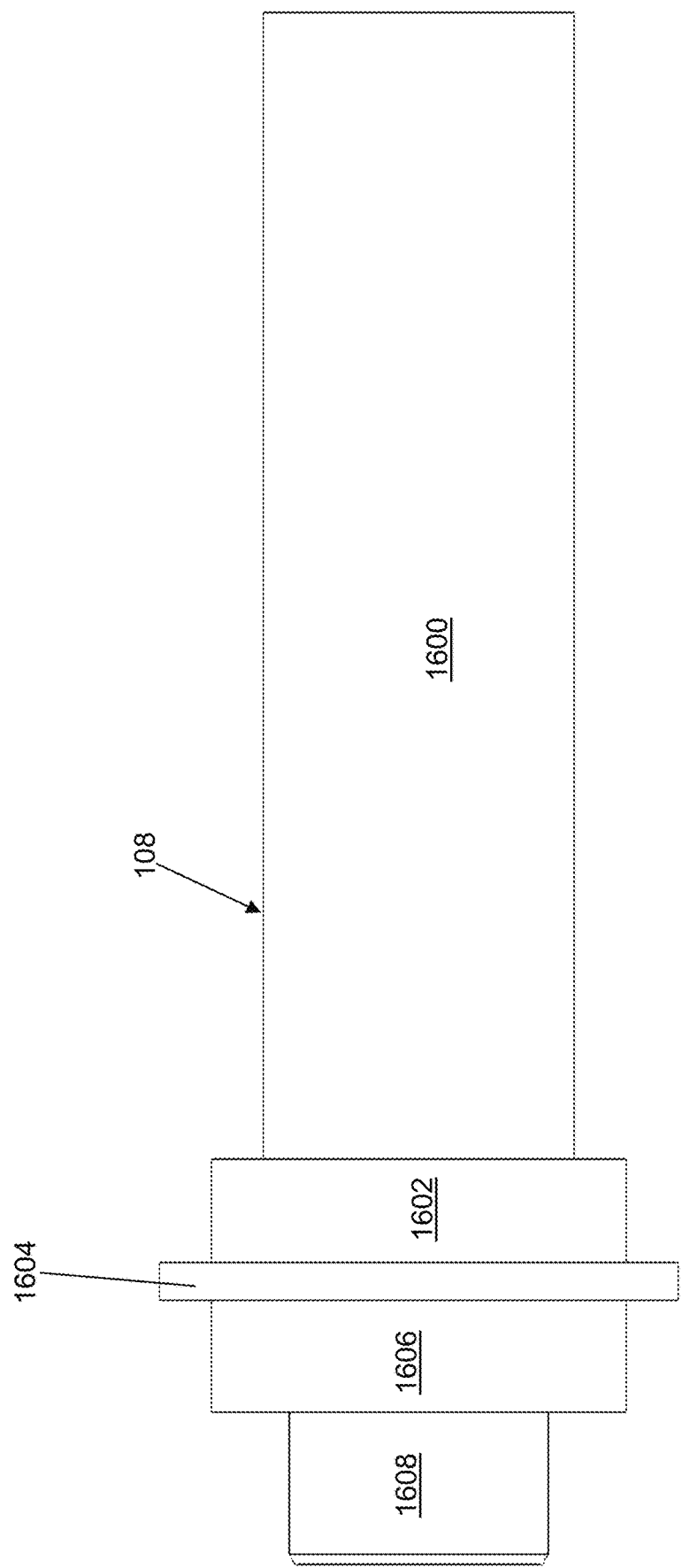
FIG. 16 depicts an axial view of a rotor of the CRAMB of FIG. 2 in accordance with an illustrative embodiment.

Referring to FIG. 16, an axial view of rotor 108 is shown in accordance with an illustrative embodiment. Rotor 108 may be formed of one or more conductive materials such as steel. Rotor 108 is positioned radially interior of CRAMB 104, motor 102, and/or RMB 106 and has a generally circular cross section with varying radius to provide an air gap between the various components of CRAMB 104, motor 102, and/or RMB 106. For example, rotor 108 may include a rotor shaft 1600, a rotor cap portion 1602, a rotor axial portion 1604, a rotor compensation portion 1606, and a rotor radial portion 1608.

The RMB portion of CRAMB 104 may include radial stator lamination stack 300, the three radial coils 304, radial rotor lamination stack 700, and rotor radial portion 1608. The AMB portion of CRAMB 104 may include axial stator 202 and rotor axial portion 1604. Compensation coil 302 and the plurality of permanent magnets 204 function as parts of both the RMB portion and the AMB portion.

Figure 17:
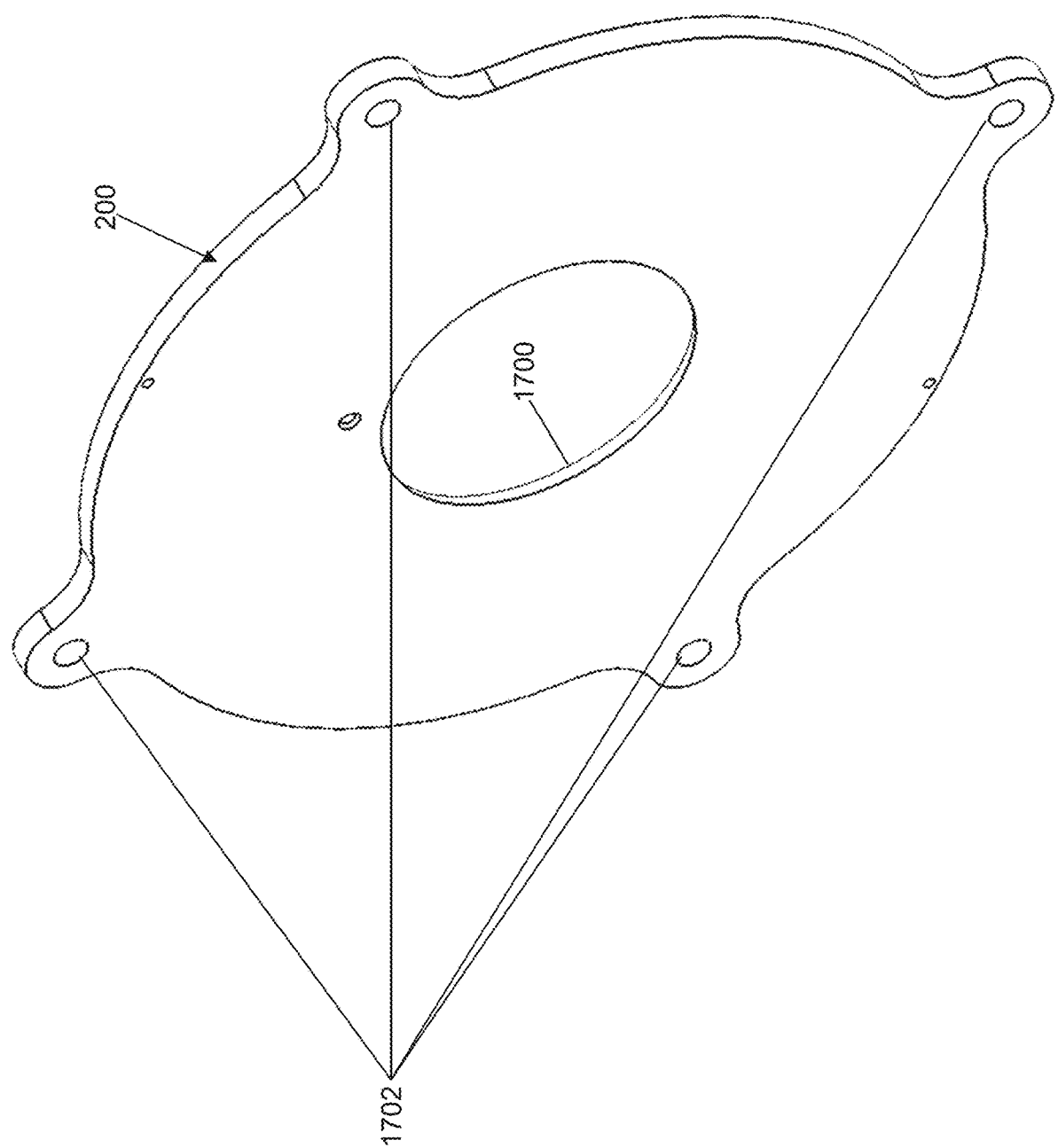
FIG. 17 depicts a perspective view of an axial stator cap of the CRAMB of FIG. 2 in accordance with an illustrative embodiment.

Referring to FIG. 17, a perspective view of axial stator cap 200 is shown in accordance with an illustrative embodiment. Axial stator cap 200 may include a stator cap shaft inner wall 1700 and a plurality of cap standoff aperture walls 1702. Rotor cap portion 1602 is sized and shaped to fit within stator cap shaft inner wall 1700.

Figure 18:
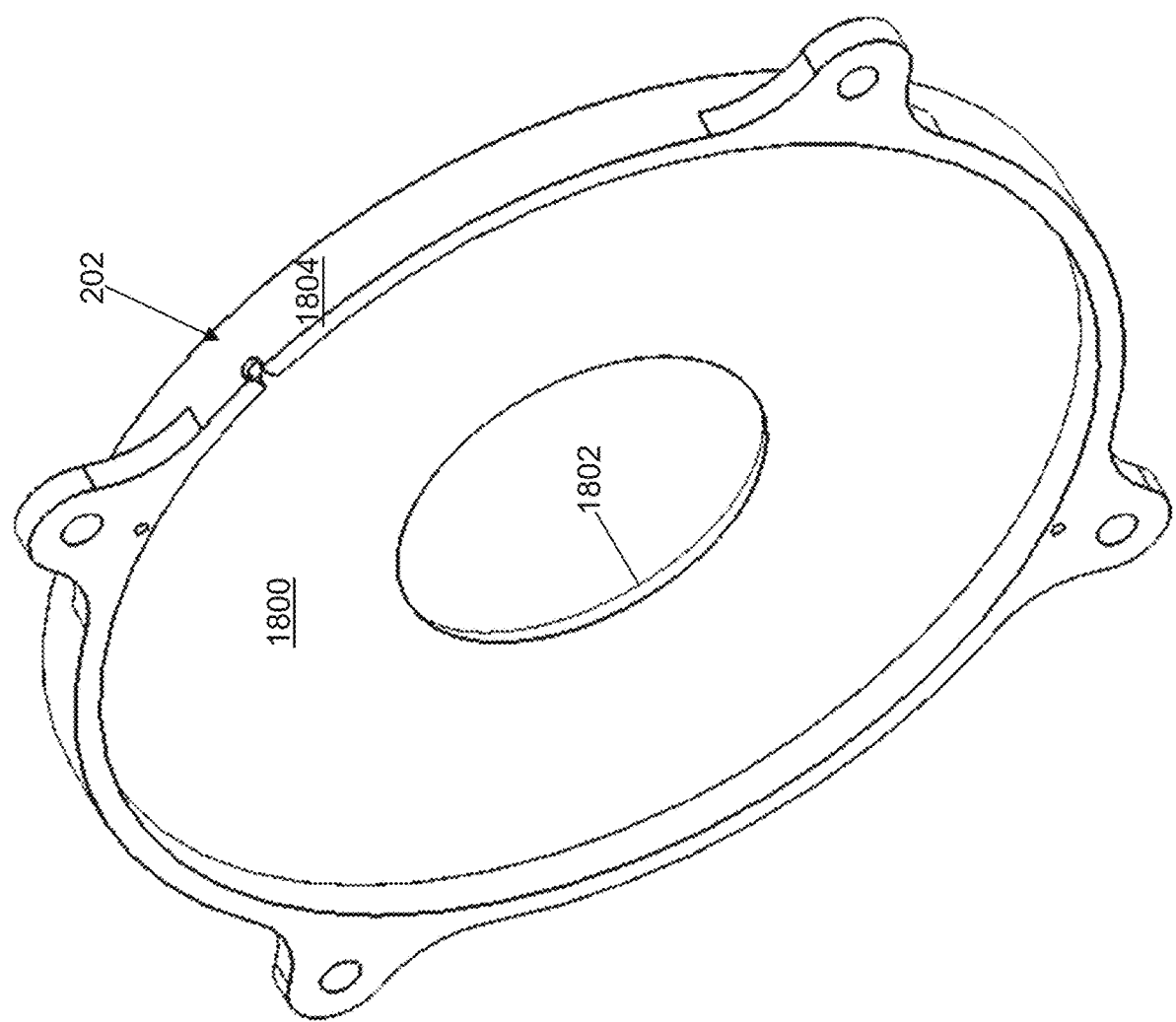
FIG. 18 depicts a perspective view of an axial stator of the CRAMB of FIG. 2 in accordance with an illustrative embodiment.

Referring to FIG. 18, a perspective view of axial stator 202 is shown in accordance with an illustrative embodiment. Axial stator 202 may include a stator base 1800, a stator shaft inner wall 1802, and a stator outer wall 1804. Stator inner aperture wall 1802 is formed through stator base 1800. Stator inner aperture wall 1802 extends from stator base 1800 toward axial stator cap 200 when axial stator 202 and axial stator 202 are mounted to CRAMB 104. Rotor axial portion 1604 is sized and shaped to fit within stator inner aperture wall 1802.

Figure 19:
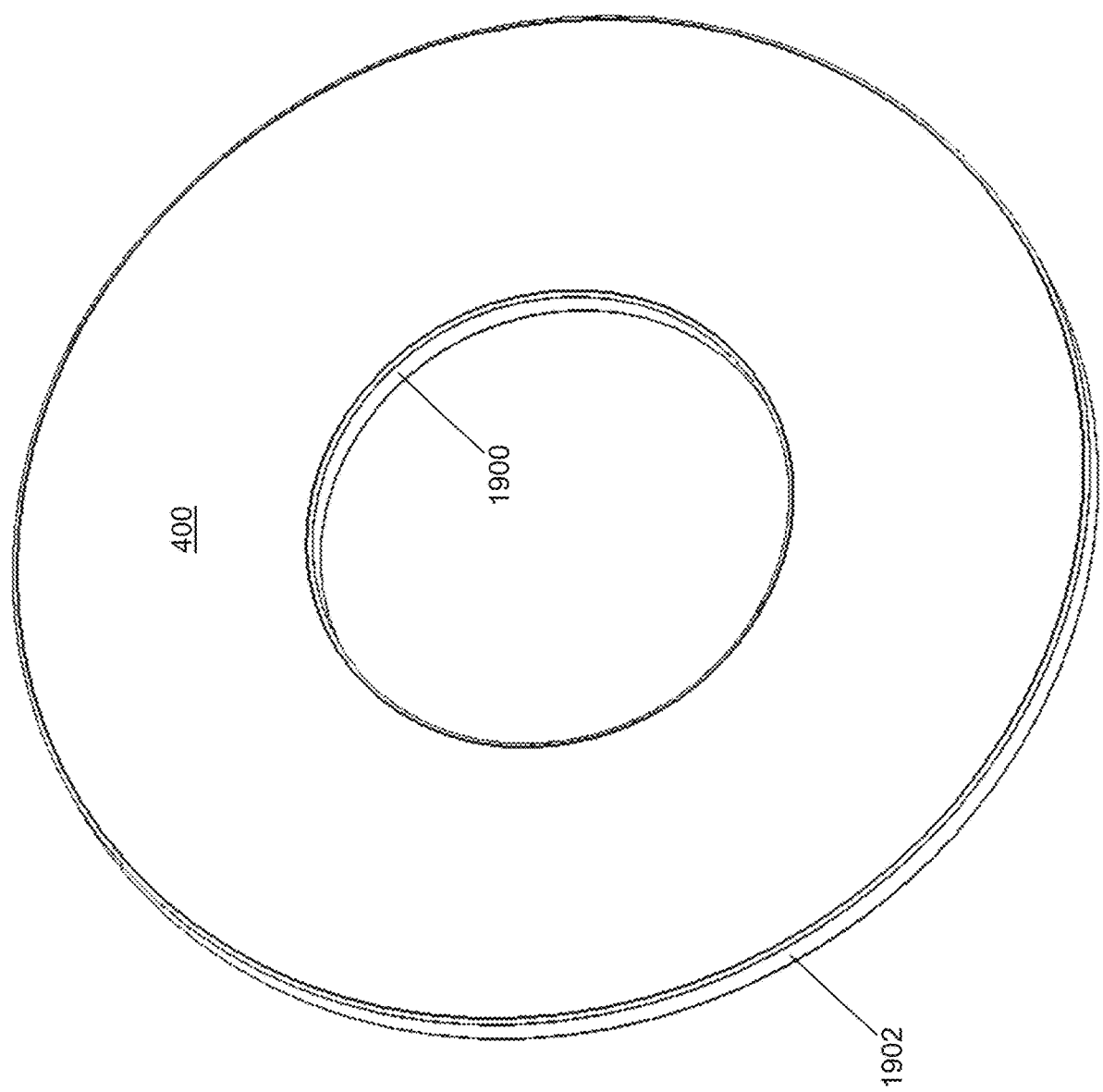
FIG. 19 depicts a perspective view of an axial coil of the CRAMB of FIG. 2 in accordance with an illustrative embodiment.

Referring to FIG. 19, a perspective view of axial coil 400 is shown in accordance with an illustrative embodiment. Axial coil 400 may include an axial coil inner wall 1900 and an axial coil outer wall 1902. Rotor axial portion 1604 fits within axial coil inner wall 1900.

Figure 20:
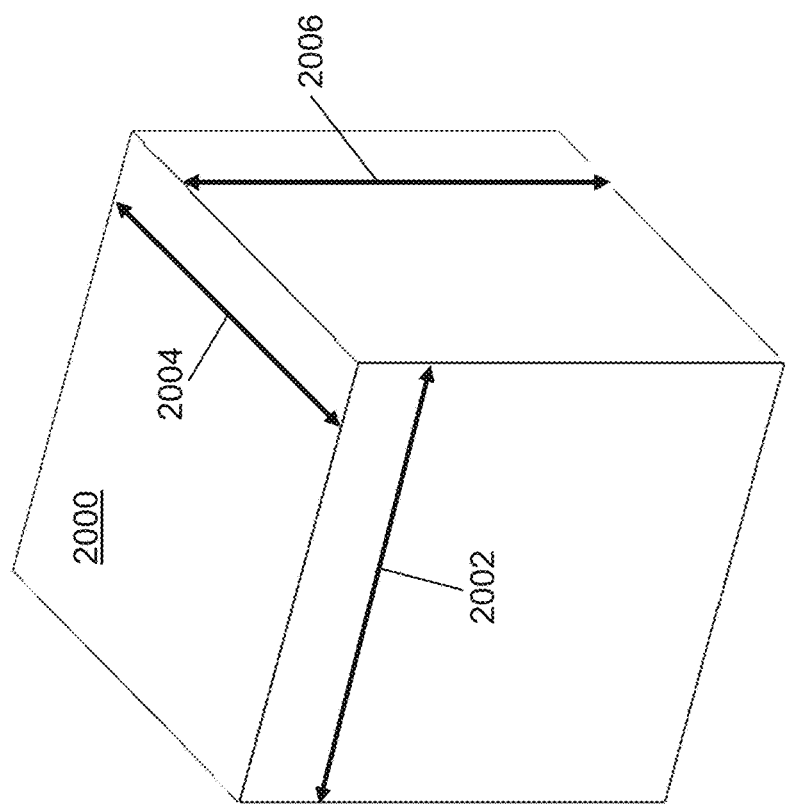
FIG. 20 depicts a perspective view of a permanent magnet of the CRAMB of FIG. 2 in accordance with an illustrative embodiment.

Referring to FIG. 20, a perspective view of a permanent magnet 2000 of the plurality of permanent magnets 204 is shown in accordance with an illustrative embodiment. Permanent magnet 2000 may be formed of a magnetic material selected to have a PM width 2002, a PM depth 2004, and a PM height 2006 that may be the same or different to provide a selected bias field $B_0$. In an illustrative embodiment, the plurality of permanent magnets 204 include 48 permanent magnet cubes. In an alternative embodiment, the plurality of permanent magnets 204 may be replaced with a continuous ring magnet.

Figure 21:
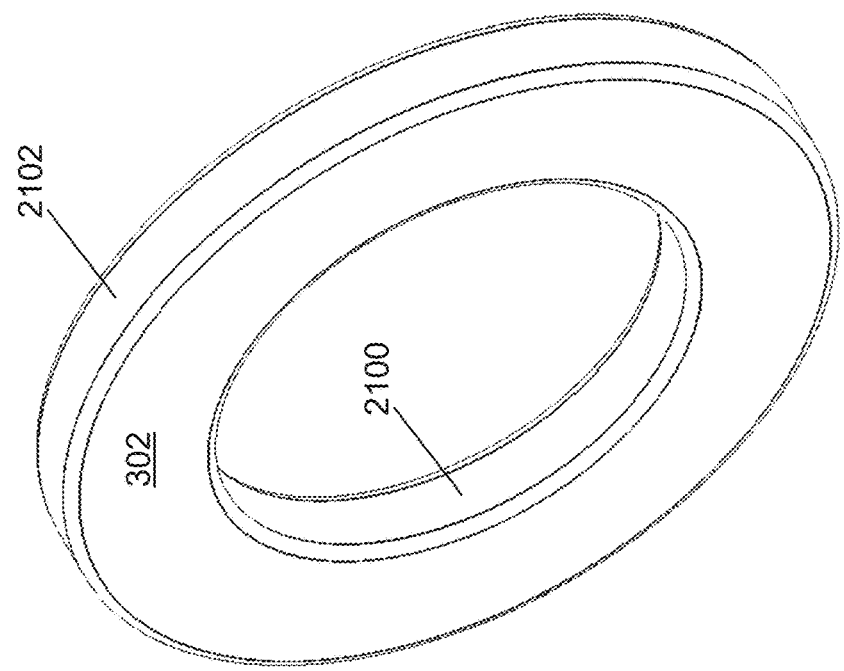
FIG. 21 depicts a perspective view of a compensation coil of the CRAMB of FIG. 2 in accordance with an illustrative embodiment.

Referring to FIG. 21, a perspective view of compensation coil 302 is shown in accordance with an illustrative embodiment. Compensation coil 302 may include a compensation coil inner wall 2100 sized and shaped such that rotor compensation portion 1606 fits therein and a compensation coil outer wall 2102 sized and shaped to fit within first radial coil 808, second radial coil 810, and third radial coil 812 above radial stator lamination stack 300. Compensation coil 302 may be formed of a coil consisting of many turns of an electrically conductive material such as copper, aluminum, etc.

Figure 23:
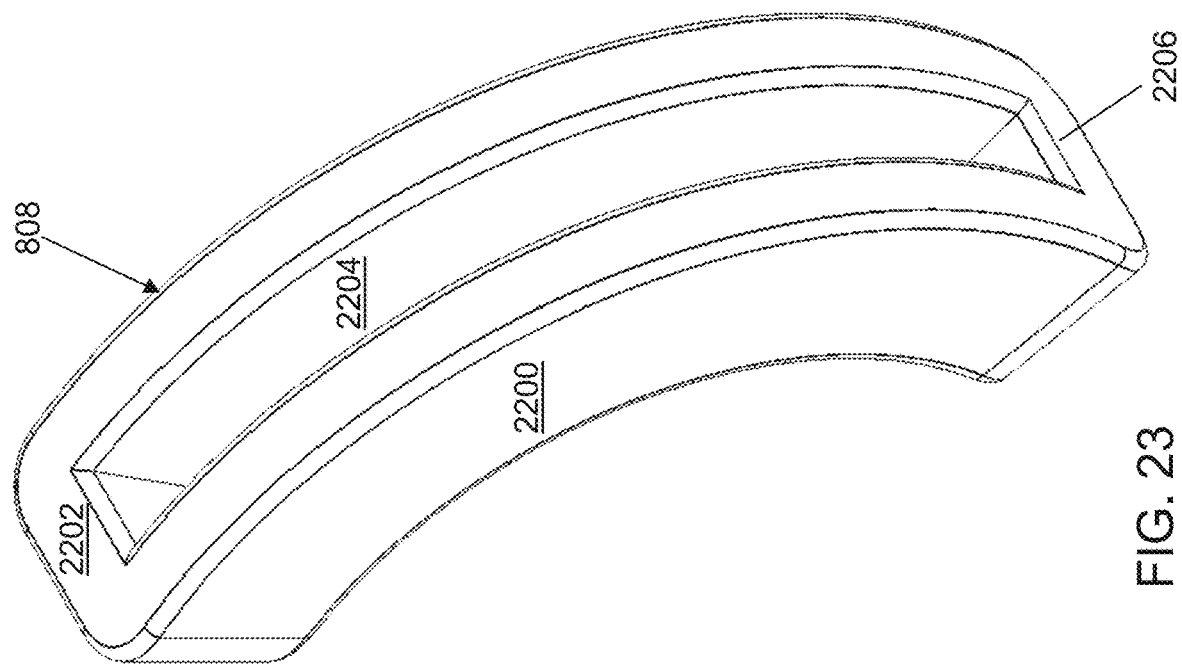
FIG. 23 depicts a second perspective view of the first radial coil of FIG. 22 in accordance with an illustrative embodiment.
Figure 22:
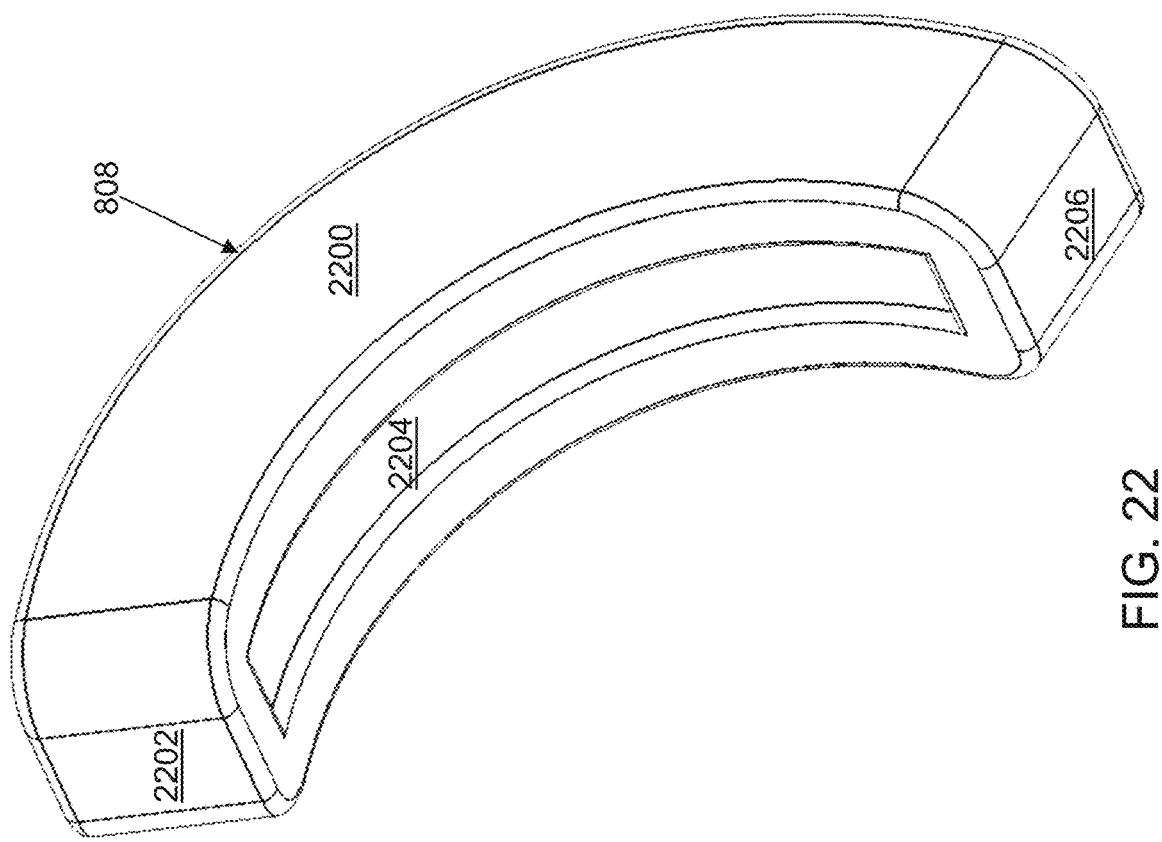
FIG. 22 depicts a first perspective view of a first radial coil of the CRAMB of FIG. 2 in accordance with an illustrative embodiment.

Referring to FIG. 22, a first perspective view of first radial coil 808 is shown in accordance with an illustrative embodiment. Referring to FIG. 23, a second perspective view of first radial coil 808 is shown in accordance with an illustrative embodiment. Second radial coil 810 and third radial coil 812 are wound to form a shape similar to first radial coil 808. Though shown as having a solid shape, the shapes illustrated show a winding shape formed when a first winding is wrapped around first radial stator lamination tooth 802, when a second winding is wrapped around second radial stator lamination tooth 804, and when a third winding is wrapped around third radial stator lamination tooth 806. The winding shape of first radial coil 808 can be described as defining a first coil plane 2200, a second coil plane 2202, a third coil plane 2204 parallel to first coil plane 2200, and a fourth coil plane 2206 parallel to second coil plane 2202.

The first winding, the second winding, and the third winding are held within three slots, respectively, and carry a current between a plurality of connectors (not shown in FIGS. 1-3) also called terminals. The windings are wound around the three teeth using various techniques to form three poles. The first winding, the second winding, and the third winding carry electrical current as determined below to provide a force to maintain rotor 108 radially within the radial portion of CRAMB 104 and within RMB 106

Figure 25:
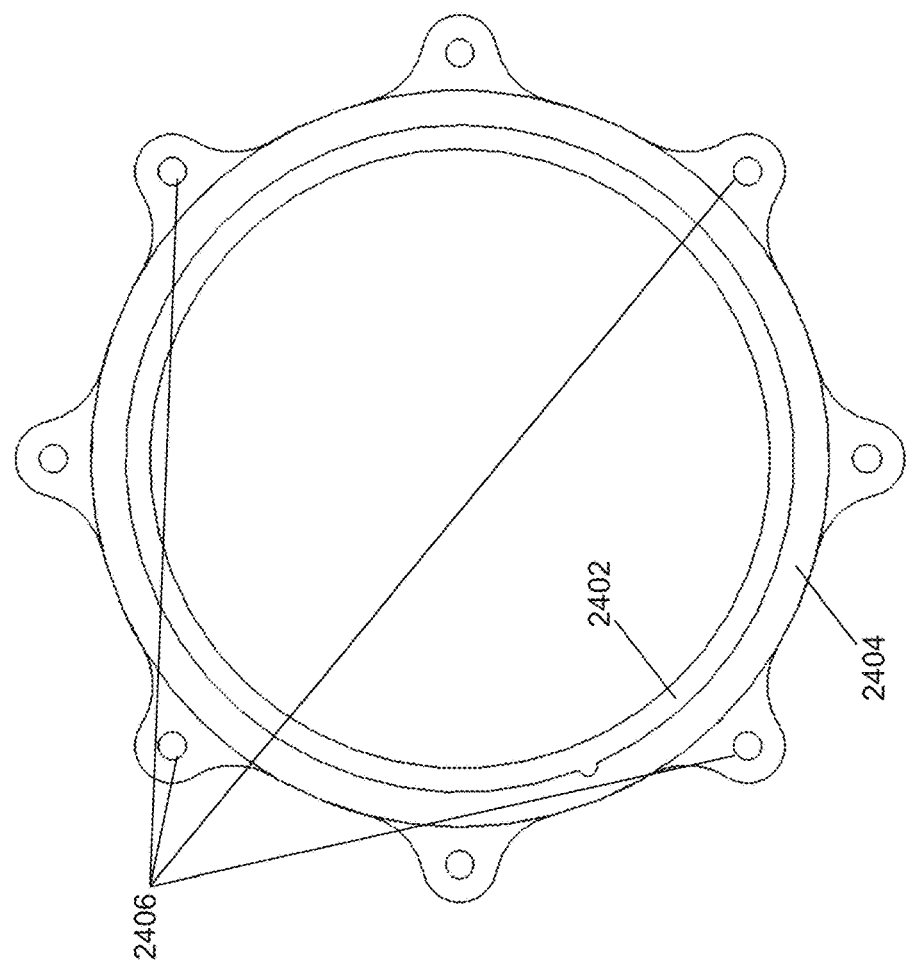
FIG. 25 depicts a top view of the ring stator of FIG. 24 in accordance with an illustrative embodiment.
Figure 24:
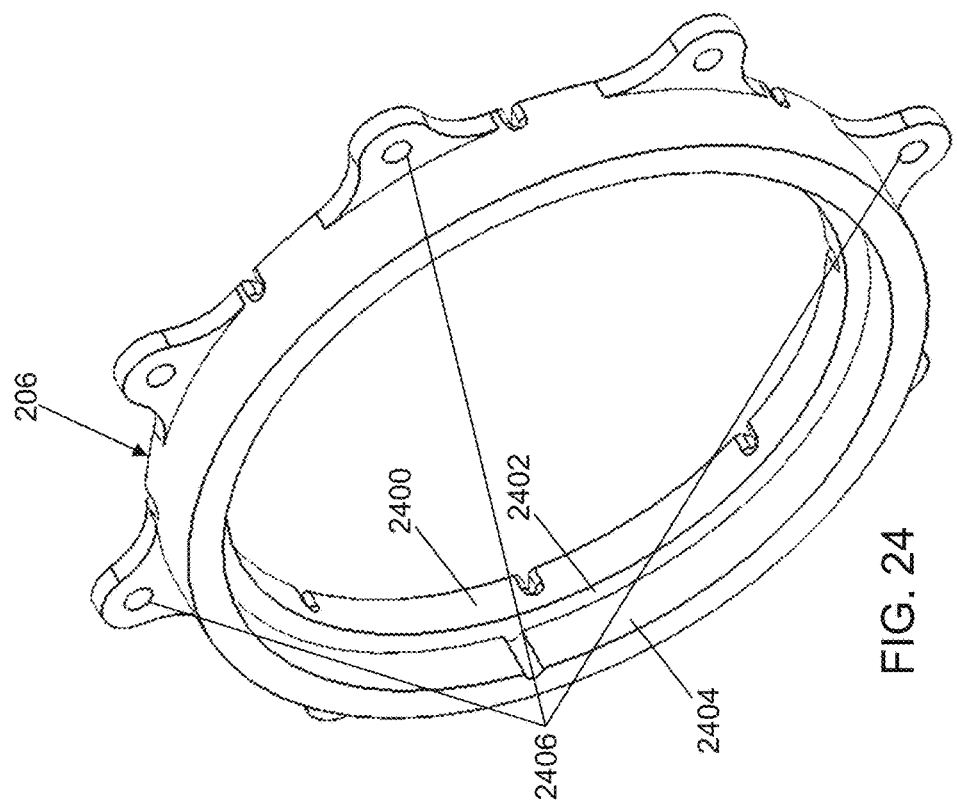
FIG. 24 depicts a perspective view of a ring stator of the CRAMB of FIG. 2 in accordance with an illustrative embodiment.

Referring to FIG. 24, a perspective view of ring stator 206 is shown in accordance with an illustrative embodiment. Referring to FIG. 25, a top view of ring stator 206 is shown in accordance with an illustrative embodiment. Ring stator 206 may include an inner support wall 2400, a stator support ledge 2402, an outer support wall 2404, and a plurality of ring stator standoff aperture walls 2406. Inner support wall 2400 has a smaller circumference than outer support wall 2404 and extends inward from outer support wall 2404. Radial stator lamination stack 300 is mounted on stator support ledge 2402 that extends above inner support wall 2400 towards outer support wall 2404 to form a ledge. Axial coil outer wall 1902 is sized and shaped to fit within an inner surface of outer support wall 2404 and to rest on stator support ledge 2402. The plurality of ring stator standoff aperture walls 2406 are formed through protrusions from outer support wall 2404. Ring stator 206 may be formed of a solid piece of ferromagnetic material such as iron, cobalt, nickel, etc.

Figure 26:
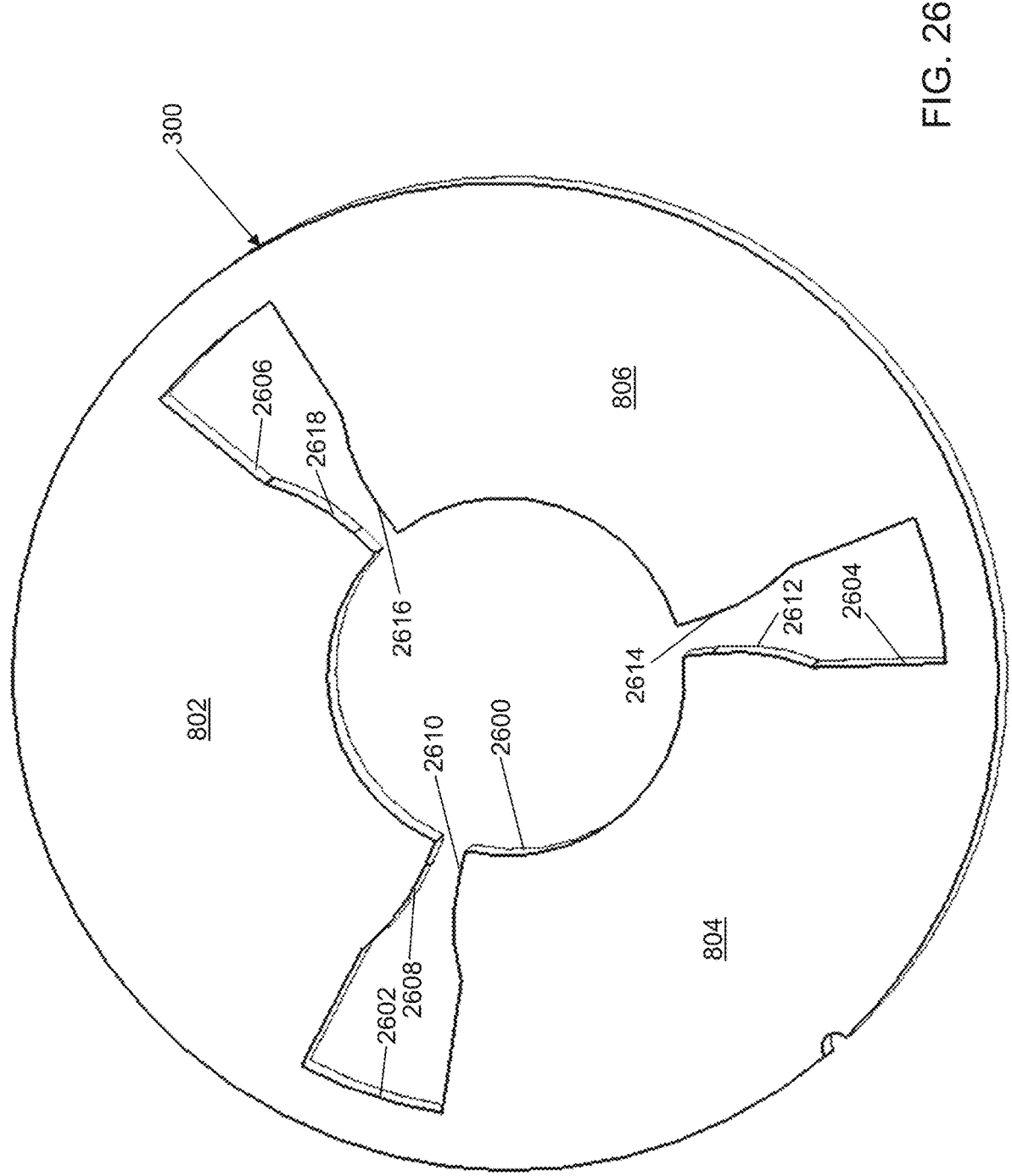
FIG. 26 depicts a bottom view of the radial stator lamination stack of the CRAMB of FIG. 2 in accordance with an illustrative embodiment.

Referring to FIG. 26, a bottom view of radial stator lamination stack 300 is shown in accordance with an illustrative embodiment. Radial stator lamination stack 300 may include stator lamination stack aperture wall 2600 sized and shaped such that radial rotor lamination stack 800 fits therein separated by radial air gap 900. Radial stator lamination stack 300 further may include a first radial coil aperture wall 2602, a second radial coil aperture wall 2604, a third radial stator coil aperture wall 2606, a first stator neck aperture wall 2608, a second stator neck aperture wall 2610, a third stator neck aperture wall 2612, a fourth stator neck aperture wall 2614, a fifth stator neck aperture wall 2616, and a sixth stator neck aperture wall 2618.

Stator lamination stack aperture wall 2600, first radial coil aperture wall 2602, second radial coil aperture wall 2604, third radial stator coil aperture wall 2606, first stator neck aperture wall 2608, second stator neck aperture wall 2610, third stator neck aperture wall 2612, fourth stator neck aperture wall 2614, fifth stator neck aperture wall 2616, and sixth stator neck aperture wall 2618 form a continuous aperture wall formed through each lamination of radial stator lamination stack 300 to form three teeth, first radial stator lamination tooth 802, second radial stator lamination tooth 804, and third radial stator lamination tooth 806, and the three slots formed between each pair of the three teeth to define the three-poles of RMB 106 and the radial portion of CRAMS 104. A shape of each slot of the three slots may vary from that shown in the illustrative embodiment.

As understood by a person of skill in the art, radial stator lamination stack 300 may be formed of laminations mounted closely together and stacked in a z-direction that is perpendicular to the x-axis and the y-axis of FIG. 10 to form a right-handed coordinate reference frame and that extends axially through RMB 106 and CRAMB 104. Each lamination may be cut to define the three teeth and radial air gap 900 between an outer rotor lamination stack aperture wall 2702 (shown referring to FIG. 27) of radial rotor lamination stack 700 and stator lamination stack aperture wall 2600. Each lamination of stator lamination stack aperture wall 2600 may be formed of a ferromagnetic material such as iron, cobalt, nickel, etc.

Compensation coil 302 is mounted above first stator neck aperture wall 2608, second stator neck aperture wall 2610, third stator neck aperture wall 2612, fourth stator neck aperture wall 2614, fifth stator neck aperture wall 2616, and sixth stator neck aperture wall 2618 adjacent first radial coil 808, second radial coil 810, and third radial coil 812.

Second coil plane 2202 of first radial coil 808 and fourth coil plane 2206 of second radial coil 810 wrap around opposite edges of first radial coil aperture wall 2602. First coil plane 2200 of first radial coil 808 wraps across a bottom surface of first radial stator lamination tooth 802, and third coil plane 2204 of first radial coil 808 wraps across a top surface of first radial stator lamination tooth 802. Second coil plane 2202 of second radial coil 810 and fourth coil plane 2206 of third radial coil 812 wrap around opposite edges of second radial coil aperture wall 2604. First coil plane 2200 of second radial coil 810 wraps across a bottom surface of second radial stator lamination tooth 804, and third coil plane 2204 of second radial coil 810 wraps across a top surface of second radial stator lamination tooth 804. Second coil plane 2202 of third radial coil 812 and fourth coil plane 2206 of first radial coil 808 wrap around opposite edges of third radial stator coil aperture wall 2606. First coil plane 2200 of third radial coil 812 wraps across a bottom surface of third radial stator lamination tooth 806, and third coil plane 2204 of third radial coil 812 wraps across a top surface of third radial stator lamination tooth 806.

Figure 27:
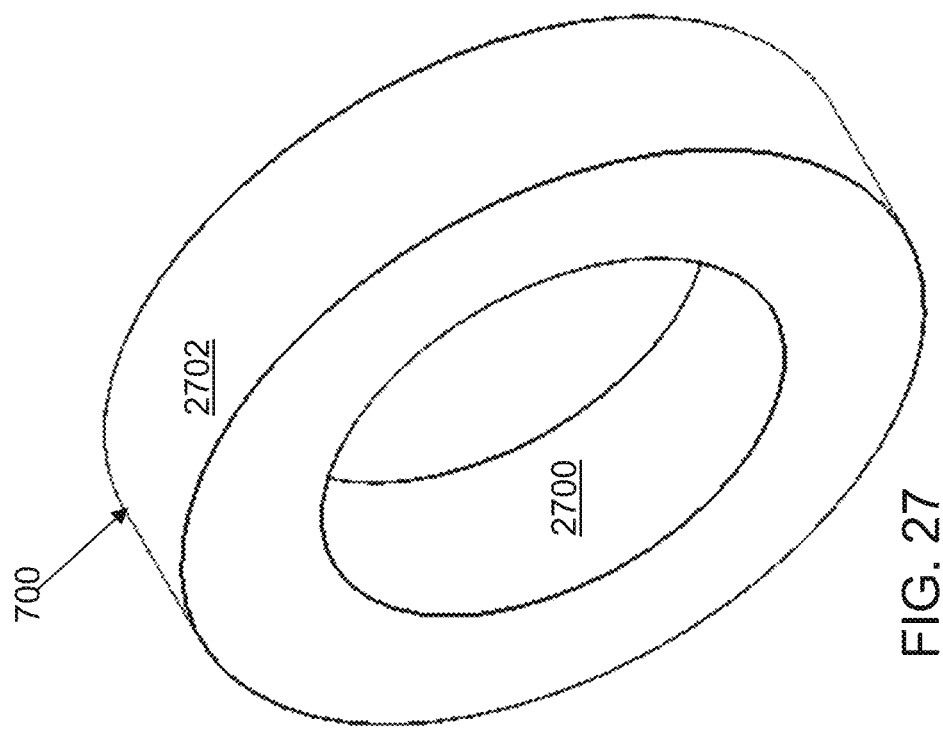
FIG. 27 depicts a perspective view of the radial rotor lamination stack of the CRAMB of FIG. 2 in accordance with an illustrative embodiment.

Referring to FIG. 27, a perspective view of radial rotor lamination stack 700 is shown in accordance with an illustrative embodiment. Radial rotor lamination stack 700 may include an inner rotor lamination stack aperture wall 2700 and outer rotor lamination stack aperture wall 2702. Inner rotor lamination stack aperture wall 2700 is sized and shaped such that rotor radial portion 1608 fits therein. Outer rotor lamination stack aperture wall 2702 fits within stator lamination stack aperture wall 2600 separated by radial air gap 900. As understood by a person of skill in the art, radial rotor lamination stack 700 may be formed of laminations mounted closely together and stacked in the z-direction. Each lamination may be cut to define inner rotor lamination stack aperture wall 2700 and outer rotor lamination stack aperture wall 2702. Each lamination of radial rotor lamination stack 700 may be formed of a ferromagnetic material such as iron, cobalt, nickel, etc.

Figure 28:
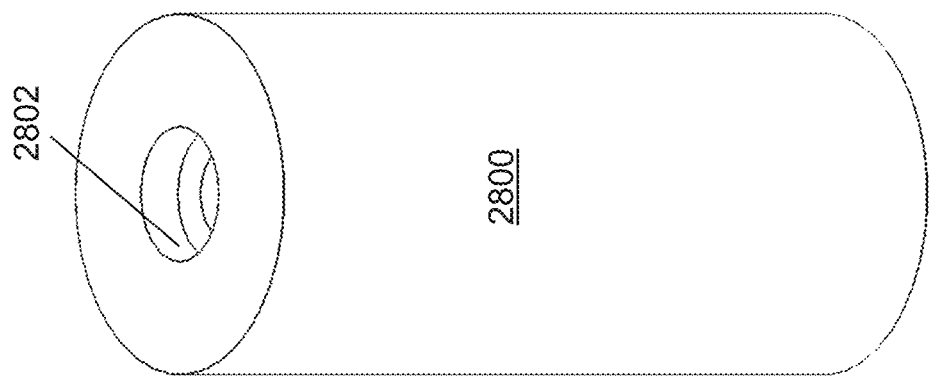
FIG. 28 depicts a perspective view of a standoff of the CRAMB of FIG. 2 in accordance with an illustrative embodiment.

Referring to FIG. 28, a perspective view of a standoff 2800 of the plurality of standoffs 210 is shown in accordance with an illustrative embodiment. Standoff 2800 may include a fastener aperture wall 2802 within which a fastener such as a screw or a rivet is inserted to mount the components of CRAMB 104 together. For example, the screw or the rivet is inserted through the plurality of cap standoff aperture walls 1702, fastener aperture wall 2802, and the plurality of ring stator standoff aperture walls 2406 to mount ring stator 206 to axial stator cap 200.

Figure 29:
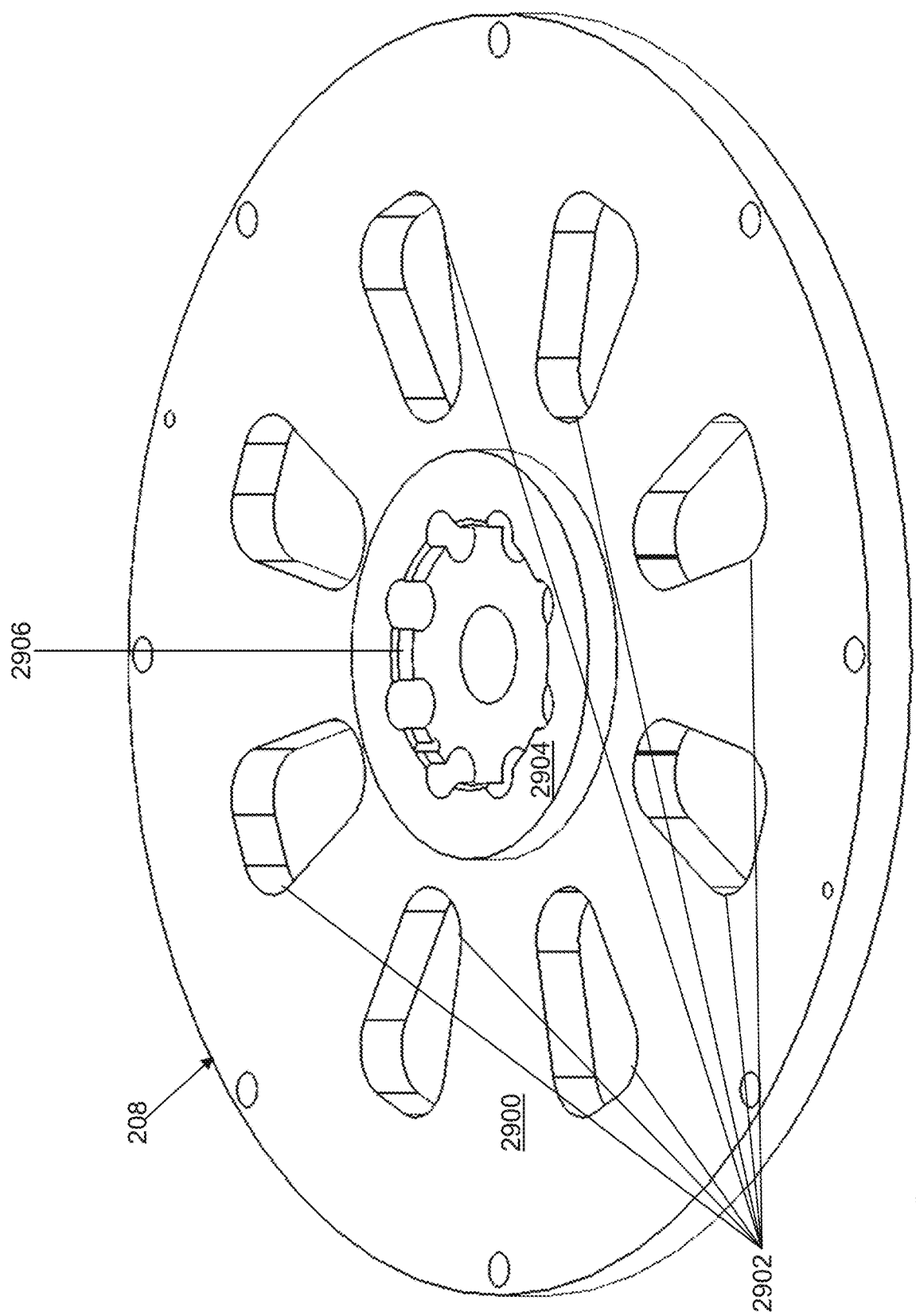
FIG. 29 depicts a top perspective view of a baseplate of the CRAMB of FIG. 2 in accordance with an illustrative embodiment.

Referring to FIG. 29, a top perspective view of baseplate 208 is shown in accordance with an illustrative embodiment. In an illustrative embodiment, baseplate 208 is formed of aluminum. Baseplate 208 may include a baseplate base 2900, baseplate cooling aperture walls 2902, a baseplate center plateau 2904, and a rotor aperture wall 2906. Baseplate cooling aperture walls 2902 are formed through baseplate base 2900 to allow heat to escape from CRAMB 104. Baseplate center plateau 2904 extends outward from baseplate base 2900. When CRAMB 104 is assembled, baseplate center plateau 2904 is mounted towards an interior of CRAMB 104. Rotor radial portion 1608 is formed in baseplate center plateau 2904 and is sized and shaped such that rotor aperture wall 2906 fits therein.

The plurality of permanent magnets 204 create a magnetomotive force resulting in flux that flows axially through stator side wall 1804 and radially across axial stator cap 200 and stator base 1800 around axial coil 400, radially through rotor axial portion 1604, axially through rotor compensation portion 1606 and rotor radial portion 1608, radially through radial rotor lamination stack 700 and radial stator lamination stack 300, and axially through outer support wall 2404 to create bias field $B_0$. The flux further flows axially through first coil plane 2200, radial stator lamination stack 300, and third coil plane 2204 of each of first radial stator lamination tooth 802, second radial stator lamination tooth 804, and third radial stator lamination tooth 806.

Equation (1) below relates a force output of RMB 106 or the radial portion of CRAMB 104 to input control currents:

$$\vec{F} = k_1 k_2 \cdot (k_2 \vec{i_c^2} + 2B_0 \cdot \vec{i_c}) \quad (1)$$

where $k_1$ is a geometry dependent first proportionality constant, $k_2$ is a second proportionality constant relating a current to the control field it produces, and $B_0$ is a bias field.

The two complex current space vectors, $\vec{i_c}$ and $\vec{i_c^2}$ are defined by equations (2) and (3) for the three-pole RMB portion of CRAMB 104 and/or of RMB 106 implemented using three poles:

$$\vec{i_c} = i_{c1} + i_{c2} \cdot e^{-j\frac{2}{3}\pi} + i_{c3} \cdot e^{-j\frac{4}{3}\pi} \quad (2)$$

$$\vec{i_c^2} = i_{c1}^2 + i_{c2}^2 \cdot e^{-j\frac{2}{3}\pi} + i_{c3}^2 \cdot e^{-j\frac{4}{3}\pi} \quad (3)$$

In equations 2 and 3, $i_{c1}$, $i_{c2}$, and $i_{c3}$ are calculated by subtracting off an average of all of the pole currents from the currents of each pole, for example, using $i_{c1} = i_1 - i_0$, $i_{c2} = i_2 - i_0$, $i_{c3} = i_3 - i_0$, where $$i_0 = \frac{i_1 + i_2 + i_3}{3}.$$

Calculation of a force vector given the currents, $i_1$, $i_2$, and $i_3$ provided to the first winding wound about first radial stator lamination tooth 802, the second winding wound about second radial stator lamination tooth 804, and the third winding wound about third radial stator lamination tooth 806, respectively, can be computed by computing the two complex current space vectors, $\vec{i_c}$ and $\vec{i_c^2}$ and substituting the computed $\vec{i_c}$ and $\vec{i_c^2}$ into equation (1). This formulation applies to magnetic bearings where the currents, $i_1$, $i_2$, and $i_3$ sum to zero amperes (A). For designs where the currents, $i_1$, $i_2$, and $i_3$ do not sum to zero, the relation applies, but a common-mode (or zero-sequence) current component contributes to the bias field $B_0$. To control a magnetic bearing, equation (1) is inverted to compute the currents for the three-pole RMB from the desired bearing forces using an exact solution to equation (1). Any desired force vector can be split into x and y components ($F_x$ and $F_y$) that are used as input with the x-axis and the y-axis defining the radial plane as illustrated in FIG. 10. Assuming ideal field behavior (no fringing fluxes, even field distribution within radial air gap 900 that contains only a radial component), the first proportionality constant $k_1$ can be computed as:

$$k_1 = \frac{\beta A}{\mu_0} \qquad (4)$$

$$\beta = \frac{2\sin\left(\frac{\theta_1}{2}\right)}{\theta_1} \qquad (5)$$

where $\beta$ is an area correction factor that accounts for a curvature of each tooth, $\theta_1$ is effective radial tooth angle 1000 in radians, A is an effective air gap area, and $\mu_0$ is a permeability of free space. For illustration, the air gap area can be computed as $A=\theta_1 RT$, where R is stator inner radius 1004, and T is stator lamination stack thickness 814 when ideal field behavior is assumed. The second proportionality constant $k_2$ relating currents to control fields can be computed as:

$$k_2 = \frac{\mu_0 N}{g} \qquad (6)$$

where g is an effective radial air gap length 900 and N is a number of turns of first radial coil 808, second radial coil 810, and third radial coil 812 that may be provided as input values for the case where the rotor is centered within the radial air gap.

To generalize this solution for control models where the air gap fields and the coil currents have a more complicated relationship (i.e., $k_2$ is a function of rotor displacement), a modified version of Equation 1 is inverted that yields a solution for air gap fields. Later, the resulting fields are converted to coil currents. The modified version of Equation 1 is a function of the air gap fields in front of each radial stator lamination tooth: $\vec{F} = k_1 \cdot (B_1^2 + B_2^2 e^{j2/3\pi} + B_3^2 e^{j4/3\pi}) = k_1 \cdot (\vec{B_c^2} + 2B_0 \cdot \vec{B_c})$, where $\vec{B_c} = B_{c1} + B_{c2} e^{j2/3\pi} + B_{c3} \cdot e^{j4/3\pi}$ and $\vec{B_c^2} = B_{c1}^2 + B_{c2}^2 \cdot e^{j2/3\pi} e^{17} + B_{c1}^2 + B_{c2}^2 \cdot e^{j2/3\pi} + B_{c3}^2 \cdot e^{j4/3\pi}$. When $B_1$ is the air gap field in front of first radial stator lamination tooth 802, $B_2$ is the air gap field in front of second radial stator lamination tooth 804, and $B_3$ is the air gap field in front of third radial stator lamination tooth 806. When $B_1$ is the air gap field in front of first radial stator lamination tooth 802, $B_2$ is the air gap field in front of second radial stator lamination tooth 804, and $B_3$ is the air gap field in front of third radial stator lamination tooth 806, $B_{c1}$, $B_{c2}$, and $B_{c3}$ are calculated by subtracting off the average of all of the air gap fields from the air gap in front of each pole, for example, using $B_{c1}=B_1-B_0$, $B_{c2}=B_2-B_0$, $B_{c3}=B_3-B_0$, where $$B_0 = \frac{B_1 + B_2 + B_3}{3}.$$

A control field space vector can be defined as a complex number $b_c = \vec{B_c^2}$ with real component x and imaginary component y:

$$b_c = x + yj \qquad (7)$$

The y-component of equation (7) can be determined by computing the roots of a depressed quartic polynomial in equation (8), where the force components $F_x$ and $F_y$ are included in the quartic coefficients.

$$y^4 + py^2 + qy + r = 0 \qquad (8)$$

Several well-known methods can be used to compute the roots of a depressed quartic equation. For example, Ferrari's method as described in Ron Irving Ron, Beyond the Quadratic Formula, American Mathematical Society, 2010 available through ProQuest Ebook Central can be used. Another common method is to compute eigenvalues of a companion matrix of the associated quartic. The quartic coefficients can be computed using equations (9), (10), and (11).

$$p = 3\left(\frac{F_x}{k_1} - 9B_0^2\right) \qquad (9)$$

$$q = 18B_0 \frac{F_y}{k_1} \qquad (10)$$

$$r = -\frac{9}{4}\left(\frac{F_y}{k_1}\right)^2 \qquad (11)$$

Because there are four roots, there are four possible y-component values as solutions. The x-component value for each of the y-component values can be computed using equation (12).

$$x = \frac{3}{2}\left(2B_0 - \frac{F_y}{k_1}\left(\frac{1}{y}\right)\right) \qquad (12)$$

When a y-component value of the four possible y-component values is zero, a depressed quartic polynomial in terms of x can be defined instead using equation (13).

$$x^4 px^2 qx + r = 0 \qquad (13)$$

where the quartic coefficients can be computed using equations (14), (15), and (16).

$$p = -3\left(\frac{F_x}{k_1} + 9B_0^2\right) \qquad (14)$$

$$q = 18B_0\left(3B_0^2 + \frac{F_x}{k_1}\right) \qquad (15)$$

$$r = -\left(27B_0^2\left(\frac{F_x}{k_1}\right) + \frac{9}{4}\left(\frac{F_y}{k_1}\right)^2\right) \qquad (16)$$

Again, because there are four roots, there are four possible x-component values as solutions. The y-component value for each of the x-component values can be computed using equation (17).

$$y = \frac{F_y}{k_1}\left(2B_0 - \frac{2}{3}x\right)^{-1} \qquad (17)$$

Either method results in the same values for x and y, but the divide by zero situation when y=0 is avoided. At this point, only real (not complex) solutions of x and y are valid, which possibly eliminates two of the four total solution sets. Control fields can be computed using equation (18) for each of the remaining valid paired solutions of x and y:

$$B_c = \begin{bmatrix} B_{c1} \\ B_{c2} \\ B_{c3} \end{bmatrix} = \begin{bmatrix} \frac{2}{3} & 0 \\ -\frac{1}{3} & \frac{\sqrt{3}}{3} \\ -\frac{1}{3} & -\frac{\sqrt{3}}{3} \end{bmatrix} \cdot \begin{bmatrix} x \\ y \end{bmatrix} \quad (18)$$

Invalid solutions can be eliminated for which any of the total field magnitudes corresponding to each solution set exceed $B_{max}$, which is the maximum allowed air gap field. Note that this is equivalent to comparing the L-infinity norm of the total fields vector to $B_{max}$, where the total fields vector is the sum of the control field vector and bias field: $|B_c+B_0[1,1,1]^T|_\infty \le B_{max}$. For illustration, an optimum solution may be selected that minimizes a conduction loss based on equation (19)

$$B_{c,optimal} = \underset{B_{c,valid}}{\mathrm{argmin}}(|B_c|_2) \quad (19)$$

where $B_{c,valid}$ represents a set of all valid solutions.

The control currents can be computed from the optimal control fields using equation (20).

$$\begin{bmatrix} i_{c1} \\ i_{c2} \\ i_{c3} \end{bmatrix} = \frac{1}{k_2} B_{c,optimal} \quad (20)$$

As another option, the control currents can, of course, be computed directly as shown below:

$$i_c = \begin{bmatrix} i_{c1} \\ i_{c2} \\ i_{c3} \end{bmatrix} = \frac{1}{k_2} \begin{bmatrix} \frac{2}{3} & 0 \\ -\frac{1}{3} & \frac{\sqrt{3}}{3} \\ -\frac{1}{3} & -\frac{\sqrt{3}}{3} \end{bmatrix} \cdot \begin{bmatrix} x \\ y \end{bmatrix} \quad (21)$$

An optimal solution can be selected based on eliminating any solution with a current larger than a maximum allowable coil current, calculating corresponding air gap fields and eliminating any solution that would exceed $B_{max}$, and, of the remaining solutions, selecting the x, y paired solution that minimizes an L2 norm of the currents $$i_{c,optimal} = \underset{i_{c,valid}}{\mathrm{argmin}}(|i_c|_2).$$

In a third option, control current calculations can be made based on an experimentally measured or pre-calculated force-current relationship. The possibility of doing this can be seen from re-writing equation (1) as $$\vec{F} = k_1 k_2^2 \rightarrow \vec{i_c^2} + 2B_0 k_1 k_2 \vec{i_c} = C_1 \vec{i_c^2} + C_2 \vec{i_c},$$

where $C_1 = k_1 k_2^2$ and $C_2 = 2B_0 k_1 k_2$. An example procedure to fit $C_1$ and $C_2$ consists of generating a force in the positive x-direction with symmetric three-phase currents of $$i_1 = \hat{I}, i_2 = i_3 = -\frac{\hat{I}}{2}.$$

In this case $$\vec{i_c} = \frac{3}{2}\hat{I}, \rightarrow \vec{i_c^2} = \frac{3}{4}\hat{I}^2,$$

resulting in a purely x-directional force solution of $F_x = 3/4 C_1 \hat{I}^2 + 3/2 C_2 \hat{I}$. This force can be measured with a load cell while $\hat{I}$ is varied and $C_1$ and $C_2$ can be fit to the resulting data. Once $C_1$ and $C_2$ are obtained, the depressed quartic of equation (8) can be solved in the same manner as previously described, where effective values of $k_1$, $k_2$ and $B_0$ are determined by solving $C_1 = k_1 k_2^2$ and $C_2 = 2B_0 k_1 k_2$. To fully define these values, $B_0$ can either be measured, or an effective value of one of the variables can simply be assumed. In the case that a value is assumed for any of these variables, $k_1$, $k_2$, and $B_0$ should no longer be regarded as having physical meaning. For example, $B_0$ would no longer be the bias field, but rather would simply be a mathematical constant.

Figure 30:
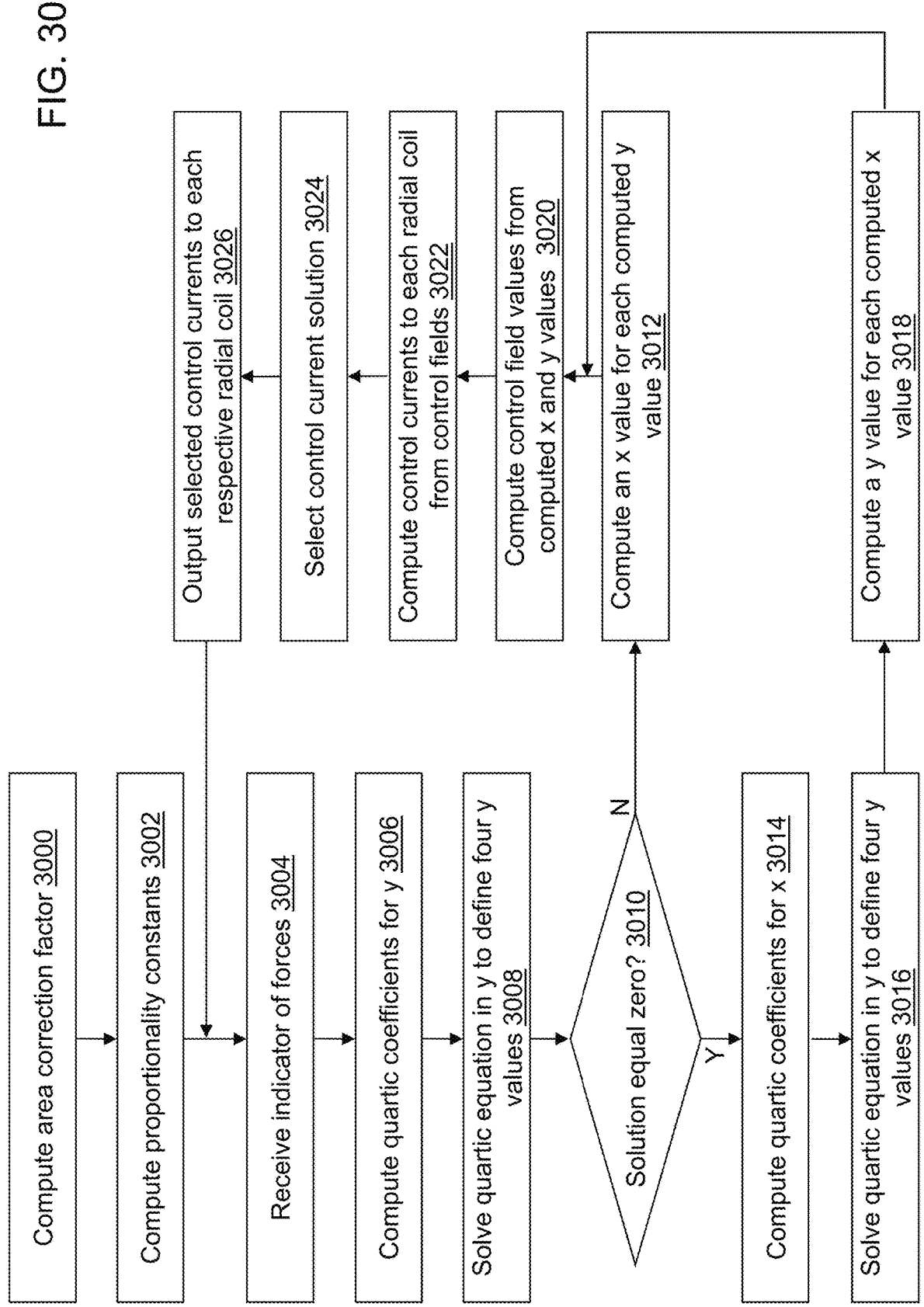
FIG. 30 depicts a flow diagram illustrating examples of operations performed by a radial magnetic bearing controller of a radial magnetic bearing portion of the CRAMB of FIG. 2 in accordance with an illustrative embodiment.

Referring to FIG. 30, example operations associated with control application 120 in computing the control currents from the desired force vector $F_x$ and $F_y$ for RMB 106 or for the RMB portion of CRAMB 104 are described. Additional, fewer, or different operations may be performed depending on the embodiment of control application 120. For example, control application 120 may further compute currents/voltages or other signals to control operation of motor 102, currents/voltages to control operation of the axial portion of CRAMB 104, etc. The order of presentation of the operations of FIG. 30 is not intended to be limiting. Some of the operations may not be performed in some embodiments. Although some of the operational flows are presented in sequence, the various operations may be performed in various repetitions, concurrently (in parallel, for example, using threads), and/or in other orders than those that are illustrated. Control application 120 may be executed automatically when motor 102 is started or when power is provided to electrical machine system 100.

In an operation 3000, the area correction factor β is computed using equation (5) above and radial tooth angle 1000 $\theta_1$ in radians provided as an input value. Alternatively, the area correction factor β may be provided as an input value. For example, radial tooth angle 1000 $\theta_1$ in radians and/or the area correction factor may be received by control application 120 after selection from a user interface window, after entry by a user into a user interface window, by extracting the information from a request, by reading a value stored in computer-readable medium 116, etc.

In an operation 3002, the first proportionality constant $k_1$ and the second proportionality constant $k_2$ are computed using equations (4) and (6), respectively and the computed area correction factor β, the air gap area A, the permeability of free space $\mu_0$, the number of turns of first radial coil 808, second radial coil 810, and third radial coil 812, and the effective radial air gap length 900 $g$ are provided as input values. Alternatively, the first proportionality constant $k_1$ and the second proportionality constant $k_2$ may be provided as an input value. For example, the first proportionality constant $k_1$ and the second proportionality constant $k_2$ and/or the air gap area A, the permeability of free space $\mu_0$, the number of turns of first radial coil 808, second radial coil 810, and third radial coil 812, and the effective radial air gap length 900 $g$ may be received by control application 120 after selection from a user interface window, after entry by a user into a user interface window, by extracting the information from a request, by reading a value stored in computer-readable medium 116, etc. The air gap area A further may be computed using $A=\theta_1 T$, where stator inner radius 1004 R and/or stator lamination stack thickness 814 T are provided as input values.

In an operation 3004, values for the desired force vector $F_x$ and $F_y$ are received. For example, the values for $F_x$ and $F_y$ may be received and/or computed from sensor measurement from one or more sensors configured to measure radial movement of rotor shaft 1600.

In an operation 3006, the quartic coefficients for the y-component can be computed using equations (9), (10), and (11) above and the bias field $B_0$, the values for $F_x$ and $F_y$, and the computed proportionality constant $k_1$. The bias field $B_0$ may be provided as an input value. The bias field $B_0$ equals an average of the three radial pole fields provided by first radial stator lamination tooth 802, second radial stator lamination tooth 804, and third radial stator lamination tooth 806. Inclusion of compensation coil 302 and elimination of zero sequence currents, the common mode flux is only dependent on the plurality of permanent magnets 204. As a result, the bias field $B_0$ may be regarded as a permanent magnet bias field. To determine what bias field $B_0$ is for RMB 106 or of the RMB portion of CRAMB 104, the field can be measured in front of each of first radial stator lamination tooth 802, second radial stator lamination tooth 804, and third radial stator lamination tooth 806 and averaged.

Traditionally, for a three-pole bearing, $B_0=0$ or $B_0=1/2 B_{max}$, where $B_{max}$ is a maximum magnetic field. The maximum magnetic field $B_{max}$ for a bearing is a maximum field in the radial air gap in front of any of the magnetic poles under any condition. Physically, this can be determined based on either a maximum current carrying capability of RMB 106 or of the RMB portion of CRAMB 104, a current rating of electrical machine controller 110, or a magnetic material saturation point, whichever is lower. A simple test that can be used to determine $B_{max}$ is to impart a force on rotor 108 that directly opposes one of first radial stator lamination tooth 802, second radial stator lamination tooth 804, or third radial stator lamination tooth 806 while measuring a field that occurs directly in front of first radial stator lamination tooth 802, second radial stator lamination tooth 804, or third radial stator lamination tooth 806 in the radial air gap. The force magnitude is continually increased until RMB 106 or of the RMB portion of CRAMB 104 is not able to overcome the imparted force. The maximum field that is measured over the course of the measurements corresponds to $B_{max}$.

The traditional values for $B_0$, $B_0=0$ or $B_0=1/2 B_{max}$, are not optimal bias field value for several reasons. Two optimal bias field values have been determined as:

$$B_{0,opt1} = \frac{1+\frac{1}{\sqrt{2}}}{3} B_{max} \approx 0.5690 B_{max}$$

$$B_{0,opt2} = \frac{1-\frac{1}{\sqrt{2}}}{3} B_{max} \approx 0.0976 B_{max}$$

Figure 32:
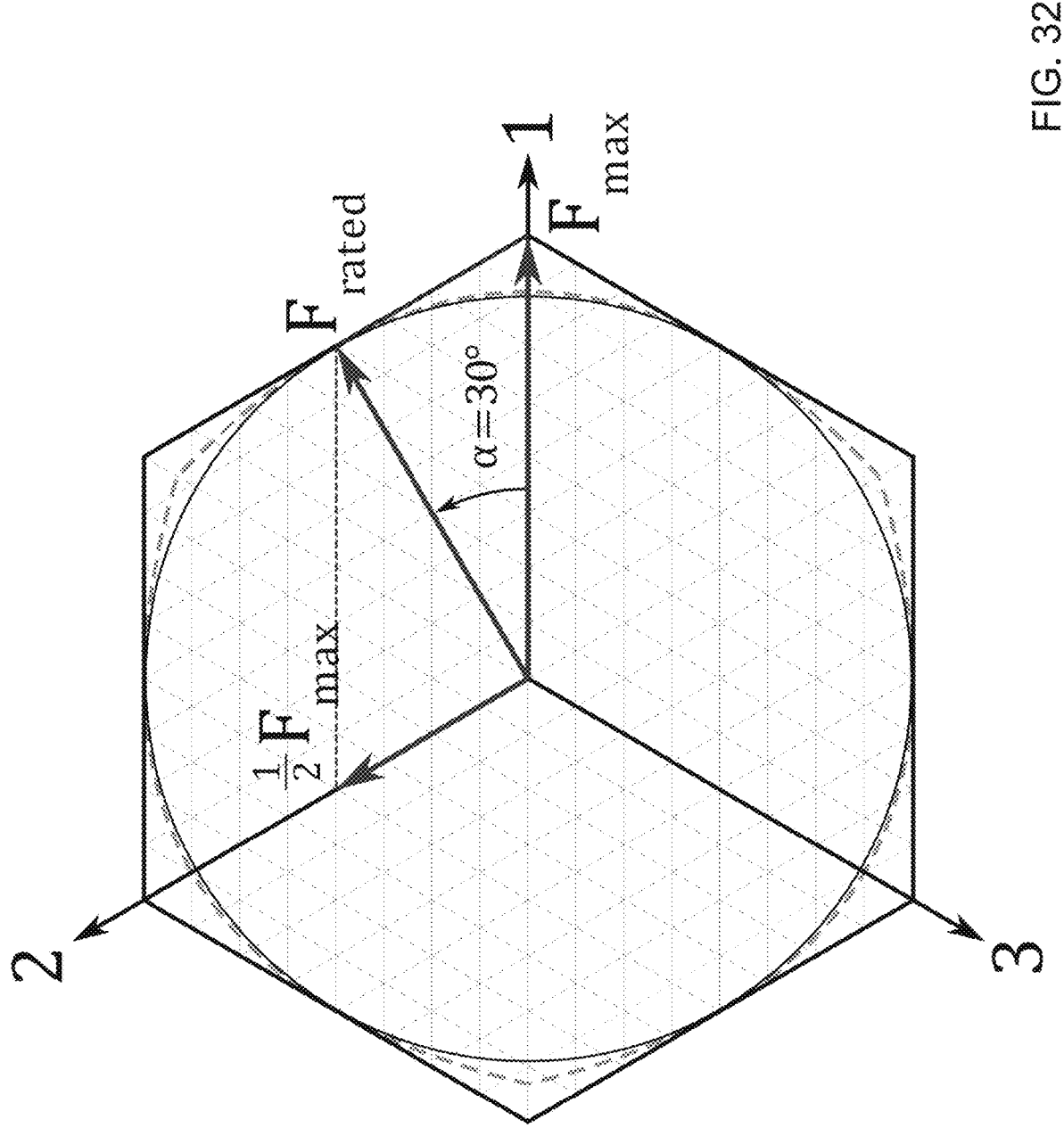
FIG. 32 depicts a maximum rated force vector of a three pole bearing and shows the individual force components that make up the net force vector in accordance with an illustrative embodiment.

A maximum possible rated force can be considered as a radius of a circle that touches a hexagonal profile at a force angle of $\alpha=30°$ as shown referring to FIG. 32. At this point, the three pole force components must be as follows $$F_1 = \sigma B_1^2 = F_{max}$$

$$F_2 = \sigma B_2^2 = 0.5 F_{max}$$

$$F_3 = \sigma B_3^2 = 0$$

where $F_{max} = \sigma B_{max}^2$. Solving for the three radial fields yields:

$$B_1 = B_{max}$$

$$B_2 = \pm \frac{1}{\sqrt{2}} B_{max}$$

$$B_3 = 0$$

Again, the bias field $B_0$ equals the average of the three radial fields. Applying this results in two bias field values:

$$\frac{B_0}{B_{max}} = \zeta = \frac{1 \pm \frac{1}{\sqrt{2}}}{3} \approx \{0.0976, 0.5960\}$$

where 0.5960 results with the positive sign and 0.0976 results with the negative sign. The value using the negative sign requires more ampere-turns compared to the value using the positive sign because each field needs to be generated by current in contrast to a permanent magnet.

Figure 31:
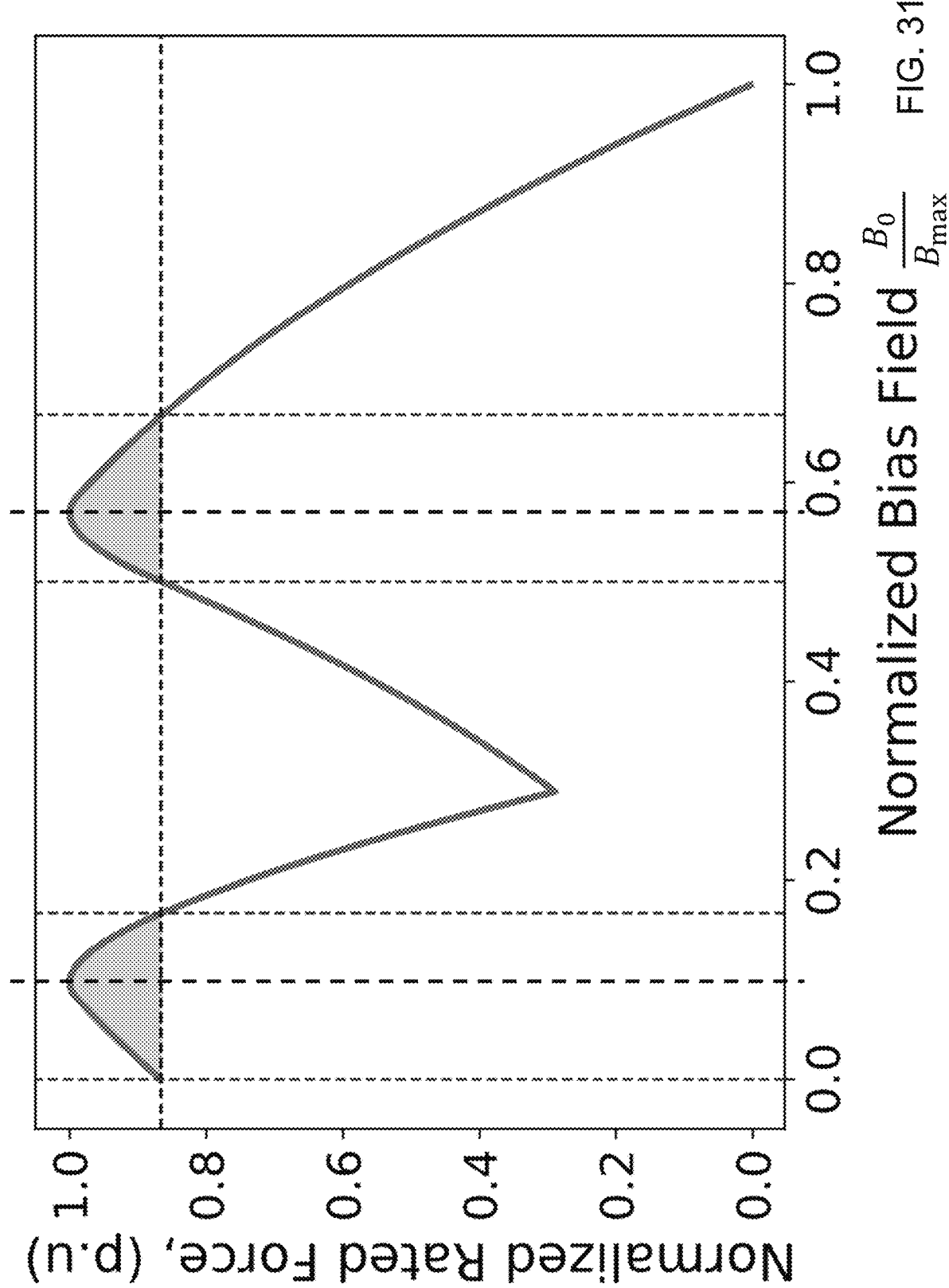
FIG. 31 depicts a normalized rated force as a function of a normalized bias field computed for the radial magnetic bearing portion of the CRAMB of FIG. 2 in accordance with an illustrative embodiment.

The optimal bias results can be validated numerically. Referring to FIG. 31, a normalized rated force curve 3100 as a function of the normalized bias field computed for the RMB portion of CRAMB 104 is shown as the bias field is swept from 0 to $B_{max}$. As expected, the two computed optimal bias field values are associated with the maximum values of normalized rated force curve 3100. If the bias had been selected as $\zeta=0.5$, as is typically done in homopolar-biased three pole bearings, the bearing rated bearing force would be reduced by 15.5%. As can be seen in FIG. 31, there are two ranges of bias field values that can be used to increase a force rating compared to traditional methods:

$$0 < \zeta < 0.167$$

$$0.5 < \zeta < 0.668.$$

Referring again to FIG. 30, in an operation 3008, the quartic equation in equation (8) is solved to define up to four solutions for the y-component denoted $y_k$, $k=1, \ldots, 4$.

In an operation 3010, a determination is made concerning whether $y_k=0$ for any of $k=1, \ldots, 4$. When $y_k=0$, processing continues in an operation 3014. When $y_k \neq 0$, processing continues in an operation 3012.

In operation 3012, up to four solutions for the x-component denoted $x_k$, k=1, ..., 4 are computed using equation (12), and processing continues in an operation 3020.

In operation 3014, the quartic coefficients for the x-component can be computed using equations (14), (15), and (16) above, the bias field $B_0$, the values for $F_x$ and $F_y$, and the computed proportionality constant $k_1$.

In an operation 3016, the quartic equation in equation (13) is solved to define up to four solutions for the x-component $x_k$, k=1, ..., 4.

In an operation 3018, up to four solutions for the y-component $y_k$, k=1, ..., 4 are computed using equation (17), and processing continues in operation 3020.

In operation 3020, values for the control field for each of first radial coil 808, second radial coil 810, and third radial coil 812 are optionally computed using equation (18) for each paired solution of $(x_k, y_k)$, k=1, ..., 4. The three values for the control field of each paired solution of $(x_k, y_k)$, k=1, ..., 4 define a control field set, where up to four control field sets may be computed. Zero or more of the control field sets may be eliminated as discussed above.

In an operation 3022, values for the control current to each of first radial coil 808, second radial coil 810, and third radial coil 812 are computed for each paired solution $(x_k, y_k)$, k=1, ..., 4 using equation (20) or equation (21). The three values for the control current of each paired solution of $(x_k, y_k)$, k=1, ..., 4 define a control current set, where up to four control current sets may be computed.

In an operation 3024, values for the control current may be selected from the up to four control current sets as discussed above.

In an operation 3026, the selected control currents are output to each of first radial coil 808, second radial coil 810, and third radial coil 812 to control operation of RMB 106 or the RMB portion of CRAMB 104. Processing may continue in operation 3004 to await updated values for the desired force vector $F_x$ and $F_y$.

Using the optimal bias fields results in a 15.5% higher rated force compared to using the traditional values of $B_0=0$ or $B_0=B_{max}$. This means that for an equivalently rated three-pole RMB, rotor 108 is either shorter in length or smaller in diameter.

Use of the control method described in FIG. 30 or =0.569 or =0.0976, alone or in combination can be applied to improve any three-pole RMB that uses a common mode bias field. This includes combined radial-axial magnetic bearings as well as purely radial bearings. The control method described in FIG. 30 computes an exact inverse force to current relationship resulting in significantly reduced force vector error. The optimal bias field increases the force density of the bearing resulting in a reduced shaft length to produce a same rated force as other three pole radial magnetic bearings. Further, the three pole radial magnetic bearing can be operated using a three phase inverter offering significant cost reduction due to the high production quantities of motor inverter products. Each half-bridge of the three phase inverter is connected to one of the first winding, the second winding, or the third winding wrapped around first radial stator lamination tooth 802, second radial stator lamination tooth 804, and third radial stator lamination tooth 806, respectively, to provide the selected control current.

As used herein, the term "mount" includes join, unite, connect, couple, associate, insert, hang, hold, affix, attach, fasten, bind, paste, secure, hinge, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element) unless specified otherwise. Elements referenced as mounted to each other herein may further be integrally formed together, for example, using a molding or thermoforming process as understood by a person of skill in the art. As a result, elements described herein as being mounted to each other need not be discrete structural elements unless specified otherwise. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations introduced in the drawings and are not intended to be limiting in any manner unless otherwise indicated.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced. Elements referenced as connected to each other herein may further be integrally formed together. As a result, elements described herein as being connected to each other need not be discrete structural elements. The elements may be connected permanently, removably, or releasably.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable medium having stored thereon computer-readable instructions that when executed by a processor cause a controller to:

receive an indicator of a first radial force value in a first radial force direction and a second radial force value in a second radial force direction from a sensor, wherein the first radial force direction is perpendicular to the second radial force direction;

compute coefficients for a first equation using the first radial force value and the second radial force value, wherein the first equation is a non-linear equation;

solve the first equation to define a plurality of first solution values;
compute a plurality of second solution values, wherein a second solution value of the plurality of second solution values is paired with a respective first solution value of the plurality of first solution values, wherein the second solution value is computed using the first radial force value and the respective first solution value;
compute a plurality of control current sets, wherein each control current set of the plurality of control current sets includes a control current value for each of three control currents, wherein the plurality of control current sets includes a control current set computed for each unique paired solution of the plurality of second solution values and the plurality of first solution values;
select a control current value for each of the three control currents from a control current set of the computed plurality of control current sets; and
output the selected control current value for each of the three control currents to a respective radial winding of a three-pole radial magnetic bearing to adjust a radial suspension force exerted by the three-pole radial magnetic bearing.

2. The non-transitory computer-readable medium of claim 1, wherein the first equation is a quartic equation defined as $y^4+py^2+qy+r=0$, where y is an imaginary part of a control field space vector, p is a first coefficient of the computed coefficients, q is a second coefficient of the computed quartic coefficients, and r is a third coefficient of the computed coefficients.

3. The non-transitory computer-readable medium of claim 2, wherein p is computed using $$p = 3\left(\frac{F_x}{k_1} - 9B_0^2\right),$$

where $F_x$ is the second radial force value, $k_1$ is a predefined proportionality constant, and $B_0$ is a predefined bias field value.

4. The non-transitory computer-readable medium of claim 3, wherein $B_0$ is defined as $0 < B_0 < 0.167 B_{max}$, where $B_{max}$ is a predefined maximum total air gap field value defined for the three-pole radial magnetic bearing.

5. The non-transitory computer-readable medium of claim 4, wherein $B_0 = 0.0976 B_{max}$.

6. The non-transitory computer-readable medium of claim 4, wherein $B_{max}$ is defined based on a maximum current carrying capability of the three-pole radial magnetic bearing.

7. The non-transitory computer-readable medium of claim 4, wherein $B_{max}$ is defined based on a magnetic material saturation point of the three-pole radial magnetic bearing.

8. The non-transitory computer-readable medium of claim 3, wherein $B_0$ is defined as $0.5 B_{max} < B_0 < 0.668 B_{max}$, where $B_{max}$ is a predefined maximum total air gap field value defined for the three-pole radial magnetic bearing.

9. The non-transitory computer-readable medium of claim 8, wherein $B_0 = 0.5690 B_{max}$.

10. The non-transitory computer-readable medium of claim 8, wherein $B_{max}$ is defined based on a maximum current carrying capability of the three-pole radial magnetic bearing.

11. The non-transitory computer-readable medium of claim 8, wherein $B_{max}$ is defined based on a magnetic material saturation point of the three-pole radial magnetic bearing.

12. The non-transitory computer-readable medium of claim 3, wherein $k_1$ is defined as $$k_1 = \frac{2\sin\left(\frac{\theta_1}{2}\right)A}{\theta_1 \mu_0},$$

where $\theta_1$ is an angle that each tooth of a stator lamination stack of the three-pole radial magnetic bearing spans, A is an air gap area of each tooth, and $\mu_0$ is a permeability of free space.

13. The non-transitory computer-readable medium of claim 2, wherein q is computed using $$q = 18 B_0 \frac{F_y}{k_1},$$

where $F_y$ is the first radial force value, $k_1$ is a predefined proportionality constant, and $B_0$ is a predefined bias field value.

14. The non-transitory computer-readable medium of claim 2, wherein r is computed using $$r = -\frac{9}{4}\left(\frac{F_y}{k_1}\right)^2,$$

where $F_y$ is the first radial force value, and $k_1$ is a predefined proportionality constant.

15. The non-transitory computer-readable medium of claim 2, wherein the second solution value is computed using $$x = \frac{3}{2}\left(2B_0 - \frac{F_y}{k_1}\left(\frac{1}{y}\right)\right),$$

where $F_y$ is the first radial force value, $k_1$ is a predefined proportionality constant, $B_0$ is a predefined bias field value, and y is the respective first solution value.

16. The non-transitory computer-readable medium of claim 1, wherein the control current set selected from the computed plurality of control current sets has a minimum L2 norm for the three control currents in comparison to other of the computed plurality of control current sets.

17. The non-transitory computer-readable medium of claim 1, wherein the plurality of control current sets are computed using $$\begin{bmatrix} i_1 \\ i_2 \\ i_3 \end{bmatrix} = \frac{1}{k_2} \begin{bmatrix} \frac{2}{3} & 0 \\ -\frac{1}{3} & \frac{\sqrt{3}}{3} \\ -\frac{1}{3} & -\frac{\sqrt{3}}{3} \end{bmatrix} \begin{bmatrix} x_k \\ y_k \end{bmatrix},$$

where $i_1$ is a first control current value of the control current set, $i_2$ is a second control current value of the control current set, $i_3$ is a third control current value of the control current set, $k_2$ is a predefined proportionality constant, and $x_k, y_k$ are a $k^{th}$ unique paired solution of the plurality of second solution values and the plurality of first solution values such that $x_k$ is one of the plurality of second solution values, and $y_k$ is one of the plurality of first solution values.

18. The non-transitory computer-readable medium of claim 1, wherein the first equation is a quartic equation defined as $x^4+px^2+q+r=0$, where x is a real part of a control field space vector, p is a first coefficient of the computed coefficients, q is a second coefficient of the computed coefficients, and r is a third coefficient of the computed coefficients.

19. The non-transitory computer-readable medium of claim 18, wherein p is computed using $$p = -3\left(\frac{F_x}{k_1} + 9B_0^2\right),$$

q is computed using $$q = 18B_0\left(3B_0^2 + \frac{F_x}{k_1}\right),$$

and r is computed using $$r = -\left(27B_0^2\left(\frac{F_x}{k_1}\right) + \frac{9}{4}\left(\frac{F_y}{k_1}\right)^2\right),$$

where $F_x$ is the first radial force value, $F_y$ is the second radial force value, $k_1$ is a predefined proportionality constant, and $B_0$ is a predefined bias field value.

20. The non-transitory computer-readable medium of claim 19, wherein the second solution value is computed using $$y = \frac{F_y}{k_1}\left(2B_0 - \frac{2}{3}x\right)^{-1},$$

where x is the respective first solution value.

* * * * *

UNITED STATES PATENT AND TRADEMARK OFFICE
CERTIFICATE OF CORRECTION

PATENT NO. : 11,018,552 B2
APPLICATION NO. : 16/387959
DATED : May 25, 2021
INVENTOR(S) : Eric Loren Severson et al.

It is certified that error appears in the above-identified patent and that said Letters Patent is hereby corrected as shown below:

In the Specification

Column 8, Line 66:
Delete the phrase "CRAMS 104." and replace with --CRAMB 104.--.

Column 11, Line 46-49:
Delete the phrase
"$\vec{F} = k_1 \cdot \left(B_1^2 + B_2^2 e^{j\frac{2}{3}\pi} + B_3^2 e^{j\frac{4}{3}\pi}\right) = k_1 \cdot \left(\overrightarrow{B_c^2} + 2B_0 \cdot \overrightarrow{B_c}\right)$, where $\overrightarrow{B_c} = B_{c1} + B_{c2} \cdot e^{j\frac{2}{3}\pi} + B_{c3} \cdot e^{j\frac{4}{3}\pi}$ and $\overrightarrow{B_c^2} = B_{c1}^2 + B_{c2}^2 \cdot e^{j\frac{2}{3}\pi} + B_{c3}^2 \cdot e^{j\frac{4}{3}\pi}$." and replace with
--$\vec{F} = k_1 \cdot \left(B_1^2 + B_2^2 e^{j\frac{2}{3}\pi} + B_3^2 e^{j\frac{4}{3}\pi}\right) = k_1 \cdot \left(\overrightarrow{B_c^2} + 2B_0 \cdot \overrightarrow{B_c}\right)$, where $\overrightarrow{B_c} = B_{c1} + B_{c2} \cdot e^{j\frac{2}{3}\pi} + B_{c3} \cdot e^{j\frac{4}{3}\pi}$ and $\overrightarrow{B_c^2} = B_{c1}^2 + B_{c2}^2 \cdot e^{j\frac{2}{3}\pi} + B_{c3}^2 \cdot e^{j\frac{4}{3}\pi}$.--.

Column 12, Line 2:
Delete the phrase "$b_c = \overrightarrow{B_c^2}$" and replace with --$b_c = \overrightarrow{B_c}$--.

Column 14, Line 5:
Delete the phrase "$C_1 = k_1 k_2^2$" and replace with --$C_1 = k_1 k_2^2$--.

Column 14, Line 27:
Delete the phrase "$C_1 = k_1 k_2^2$" and replace with --$C_1 = k_1 k_2^2$--.

Column 15, Line 17:
Delete the phrase "$A = \theta_1 T$," and replace with --$A = \theta_1 RT$,--.

Signed and Sealed this
Fifth Day of October, 2021

Drew Hirshfeld
*Performing the Functions and Duties of the
Under Secretary of Commerce for Intellectual Property and
Director of the United States Patent and Trademark Office*

Column 16, Lines 15-21:
Delete the phrase
"$F_1 = \sigma B_1{}^2 = F_{max}$ $F_2 = \sigma B_2{}^2 = 0.5 F_{max}$ $F_3 = \sigma B_3{}^2 = 0$ where $F_{max} = \sigma B_{max}{}^2$." and replace with
--$F_1 = \sigma B_1^2 = F_{max}$ $F_2 = \sigma B_2^2 = 0.5 F_{max}$ $F_3 = \sigma B_3^2 = 0$ where $F_{max} = \sigma B_{max}^2$--.

Column 16, Line 47:
Delete the phrase "bias field computed" and replace with --bias field $\zeta$ computed--.

Column 17, Line 40:
Delete the phrase "$B_0 = B_{max}$." and replace with --$B_0 = \frac{1}{2} B_{max}$--.

Column 17, Lines 43-44:
Delete the phrase "or = 0.569 or = 0.0976," and replace with --or $\zeta = 0.569$ or $\zeta = 0.0976$,--.

In the Claims

Claim 2, Column 19, Lines 29-30:
Delete the phrase "$q$ is a second coefficient of the computed quartic coefficients," and replace with --$q$ is a second coefficient of the computed coefficients,--.